US006809258B1

(12) United States Patent
Dang et al.

(10) Patent No.: US 6,809,258 B1
(45) Date of Patent: Oct. 26, 2004

(54) APPARATUS FOR CABLE ROUTING MANAGEMENT

(75) Inventors: Long Huu Dang, San Jose, CA (US); Nguyen Tu Nguyen, San Jose, CA (US); Saeed Seyed, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/374,832

(22) Filed: Feb. 24, 2003

(51) Int. Cl.[7] .................................................. H02G 3/08
(52) U.S. Cl. ............................. 174/50; 174/60; 174/64; 174/58; 220/4.02; 439/535
(58) Field of Search .............................. 174/50, 58, 63, 174/17 R, 60, 64, 135; 220/4.02, 3.6, 3.8; 248/906; 439/535; 385/134, 135

(56) References Cited

U.S. PATENT DOCUMENTS

| | | | | |
|---|---|---|---|---|
| 5,286,919 A | * | 2/1994 | Benson et al. | 174/50 |
| 5,998,732 A | * | 12/1999 | Caveney et al. | 174/48 |
| 6,498,293 B2 | * | 12/2002 | Marchand et al. | 174/50 |
| 6,534,709 B2 | * | 3/2003 | English | 174/50 |
| 6,631,237 B2 | * | 10/2003 | Knudsen et al. | 385/134 |
| 6,674,000 B2 | * | 1/2004 | Lambiaso | 174/50 |

* cited by examiner

Primary Examiner—Dhiru R Patel

(57) ABSTRACT

An apparatus for managing the routing of a cable intercoupling two components in an installation is disclosed. The apparatus has a drawer for storing a portion of the cable and a drawer for cross-connecting the cable, which is connected to one component, with another cable, which is connected to the other component. The apparatus can be used with optical and electrical cables.

41 Claims, 24 Drawing Sheets

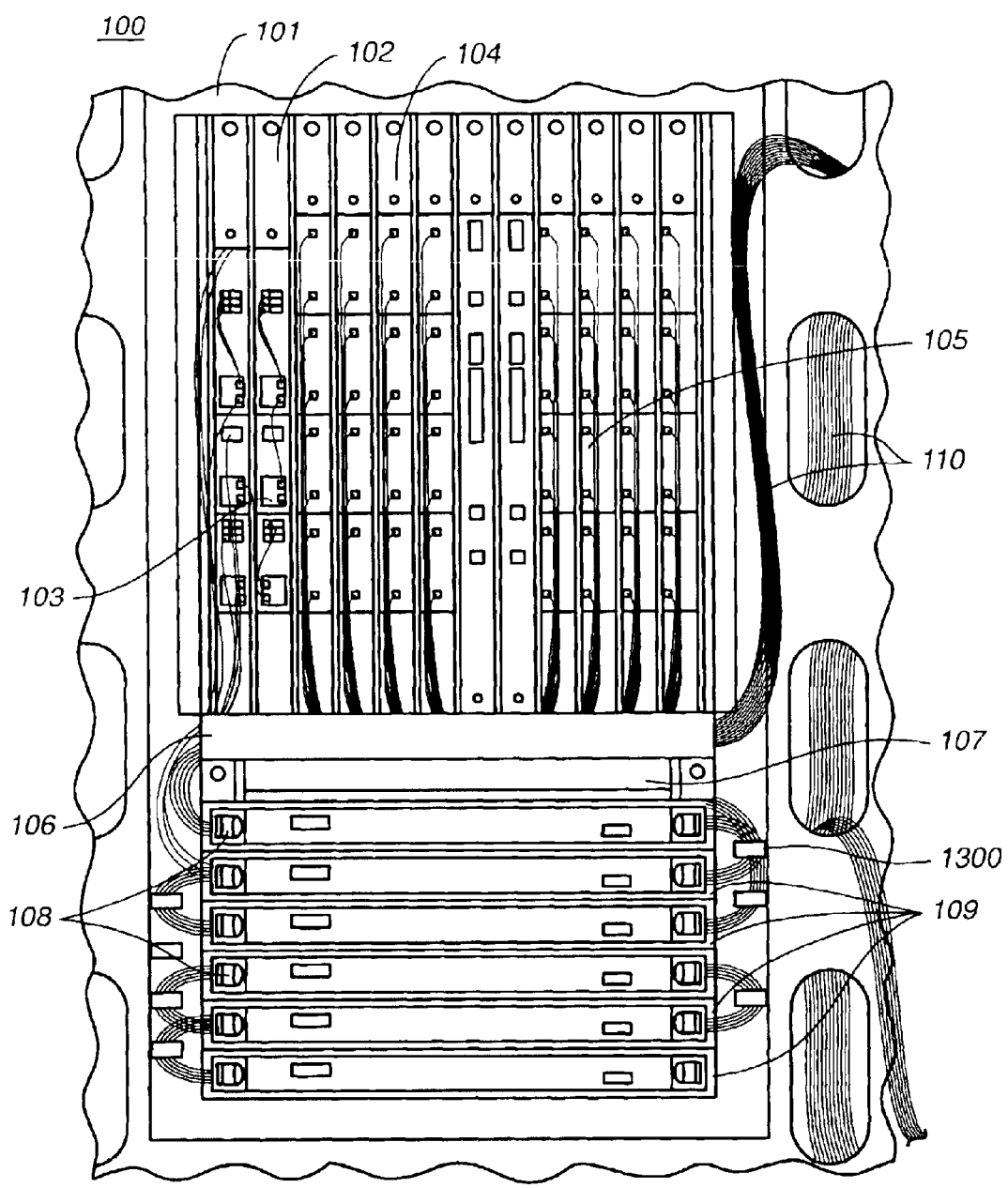
FIG._1

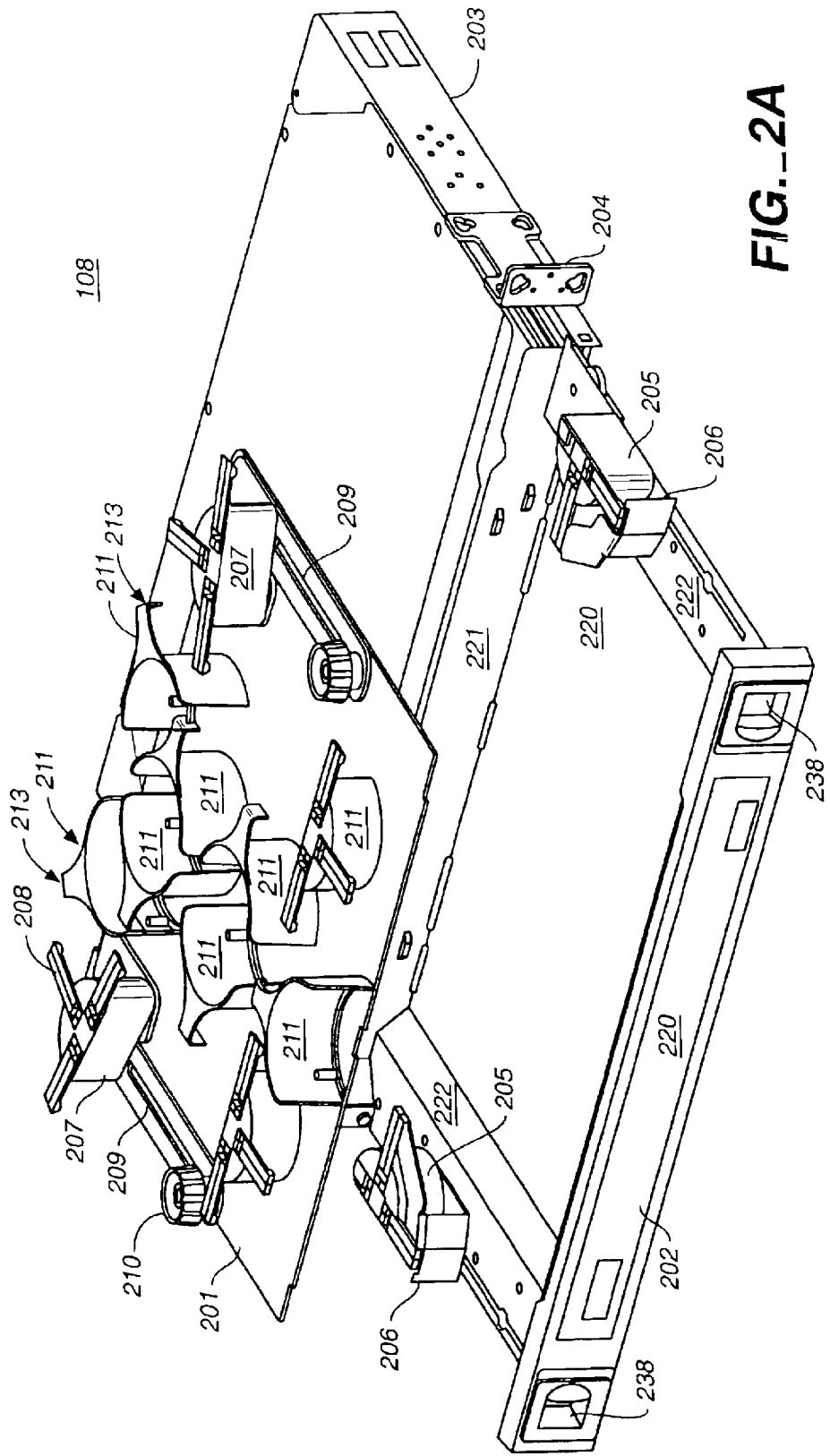
FIG._2A

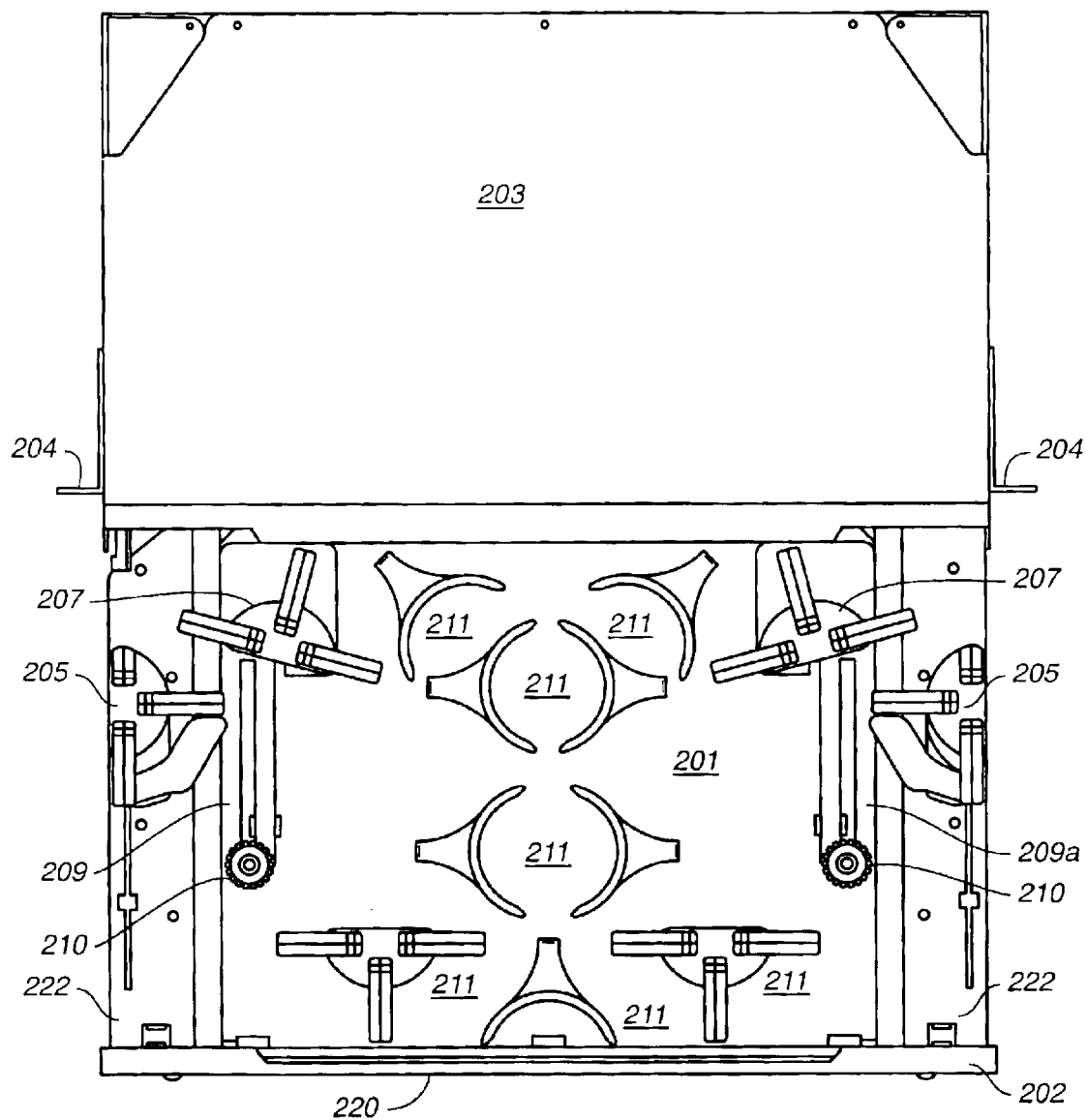
FIG._2B

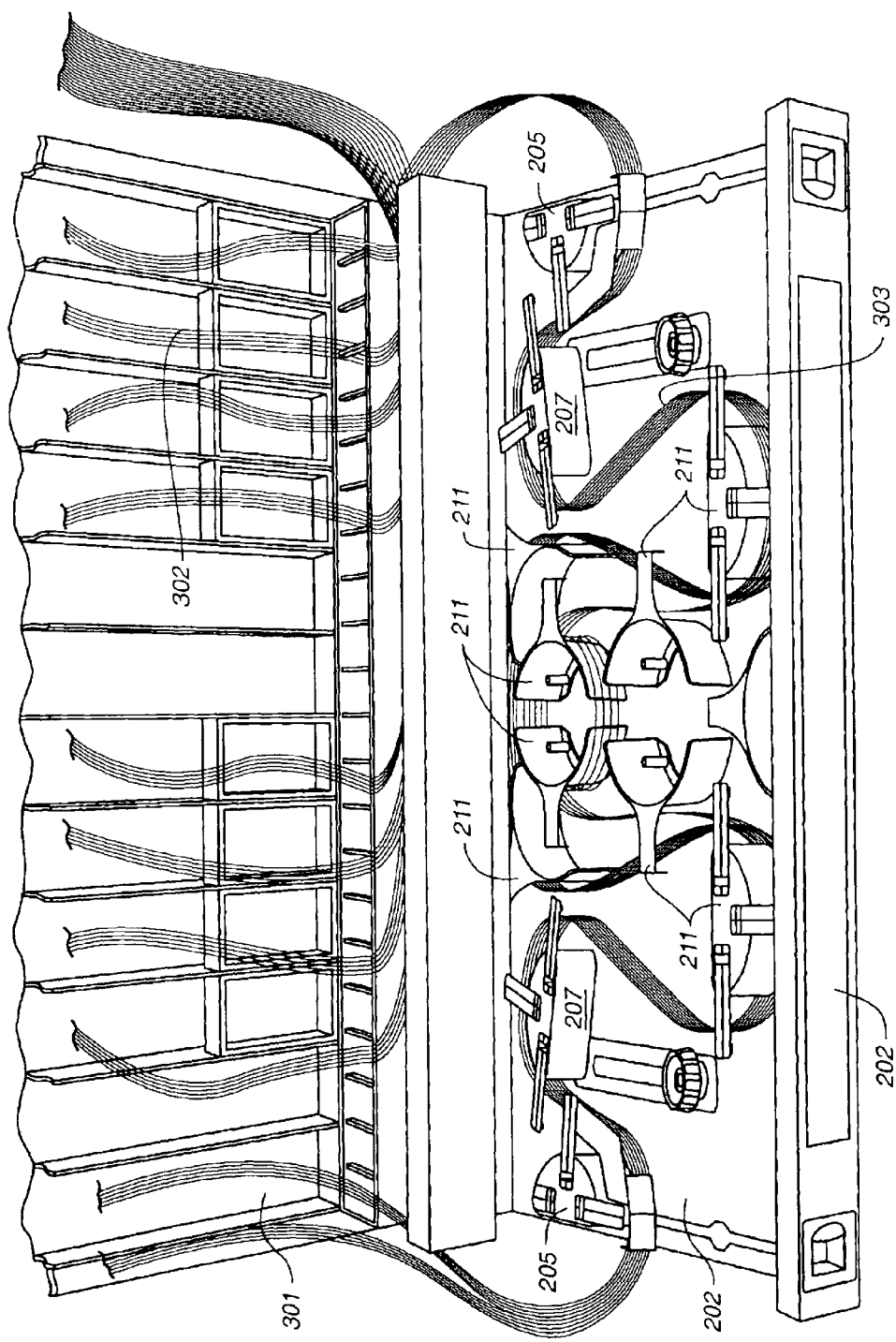
FIG._3A

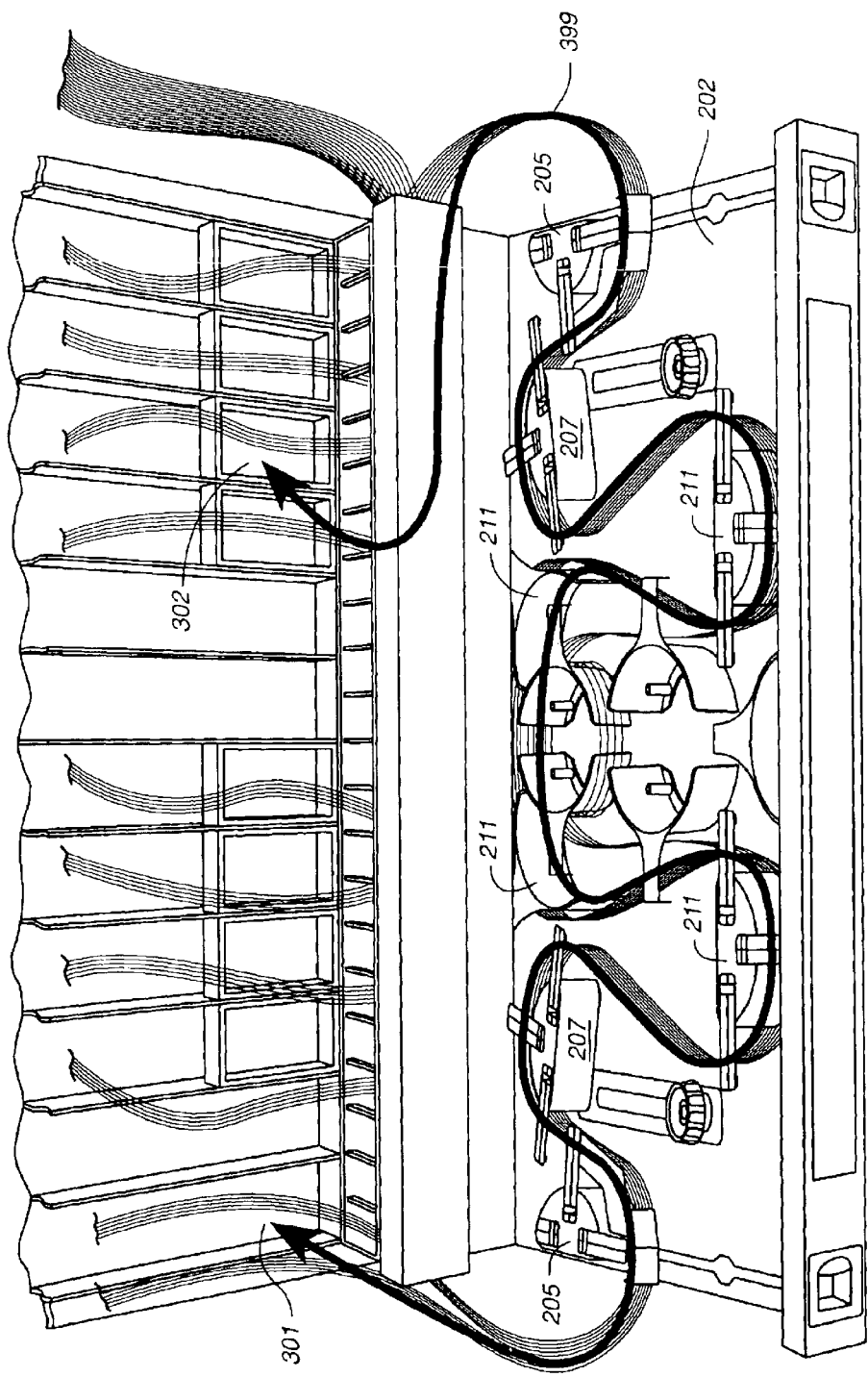
FIG._3B

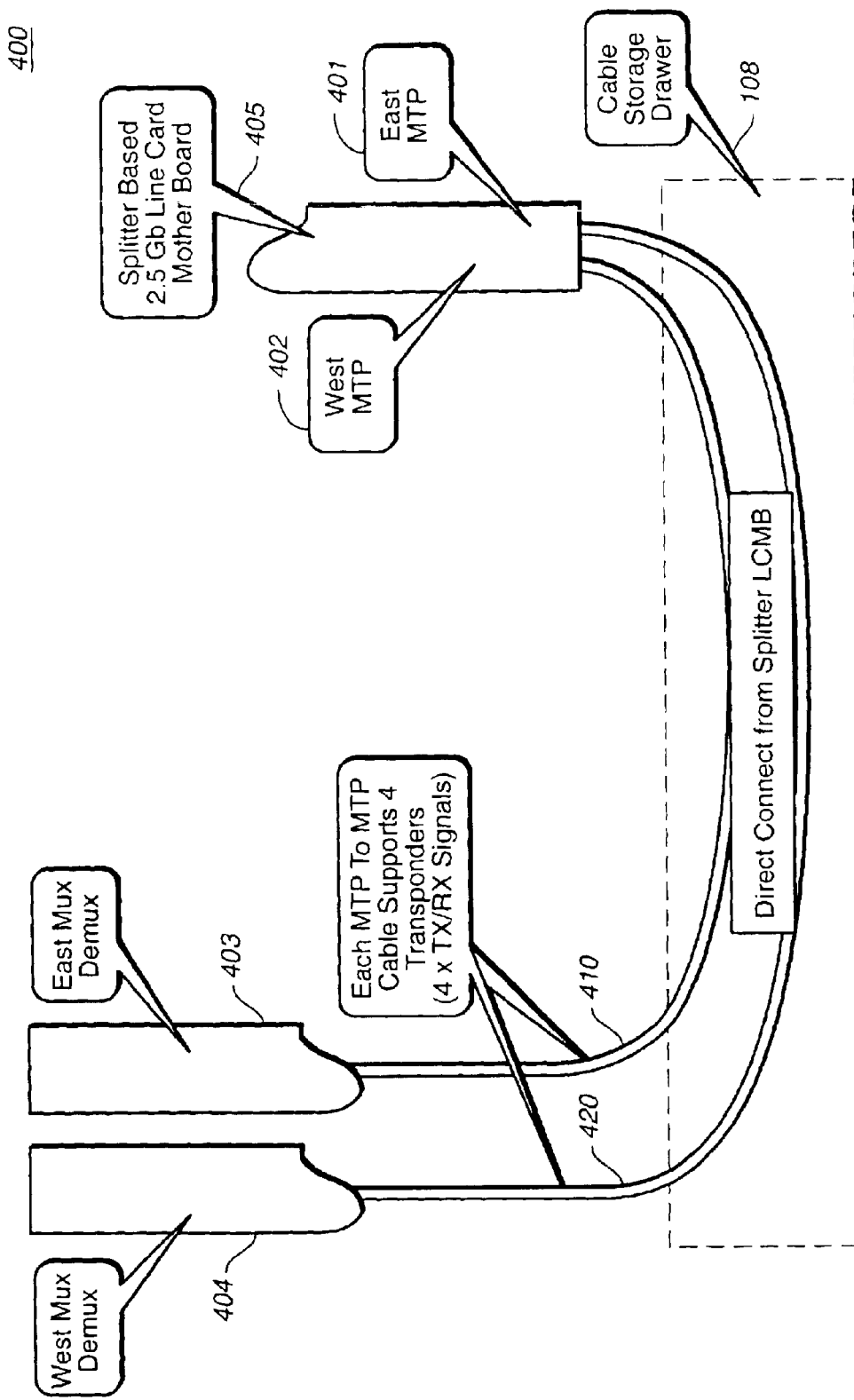
FIG._4

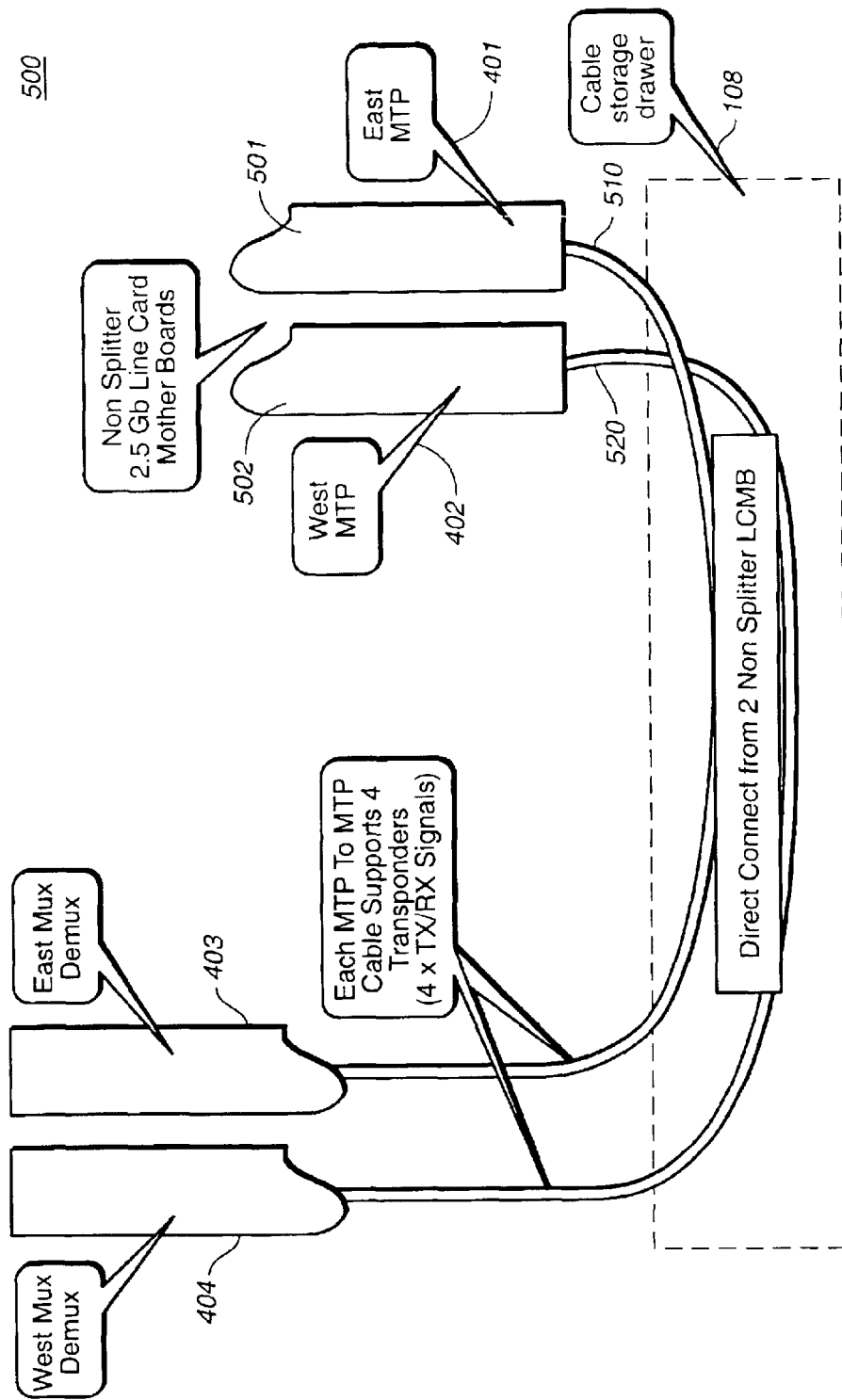
FIG._5

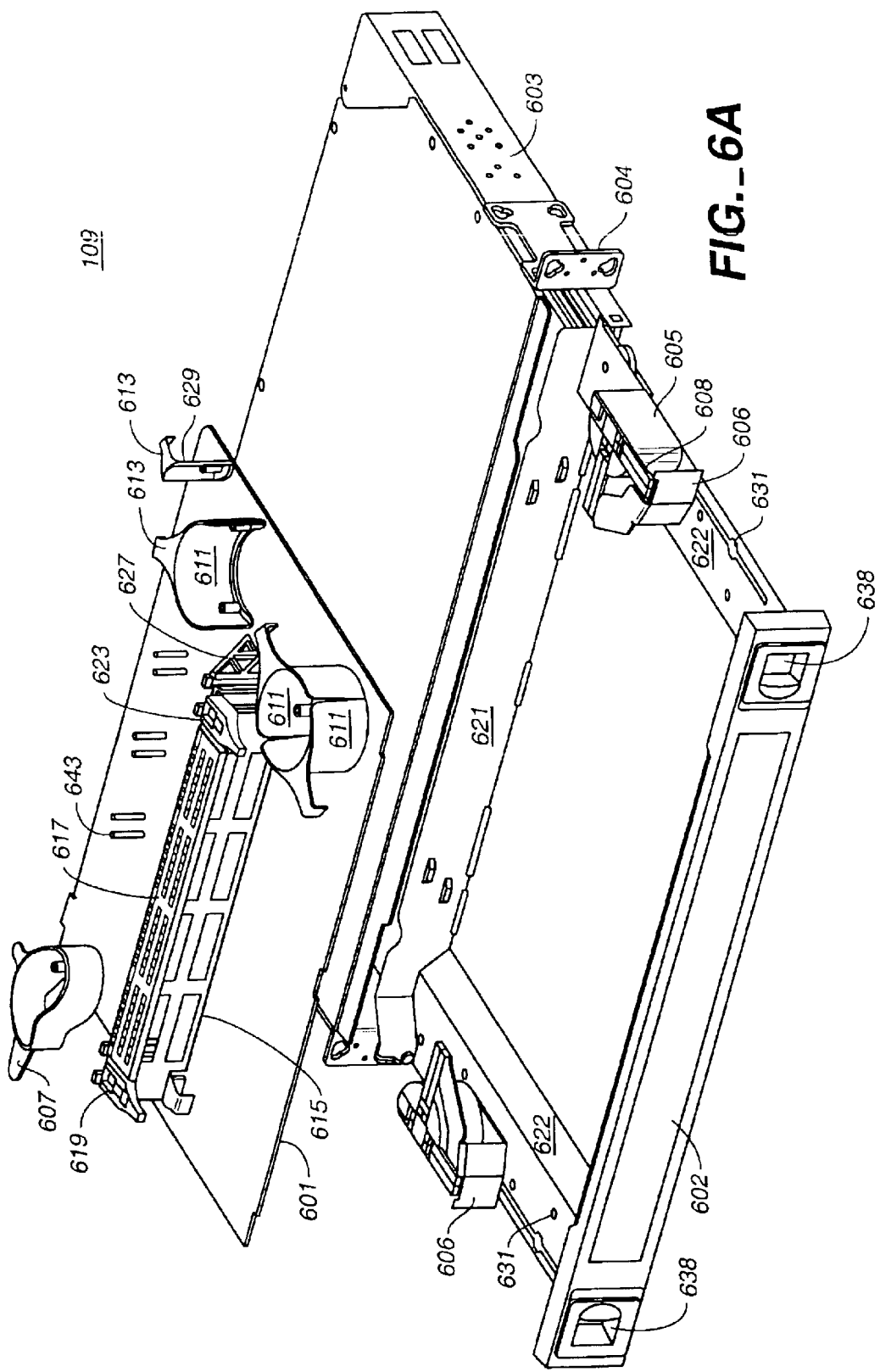
FIG._6A

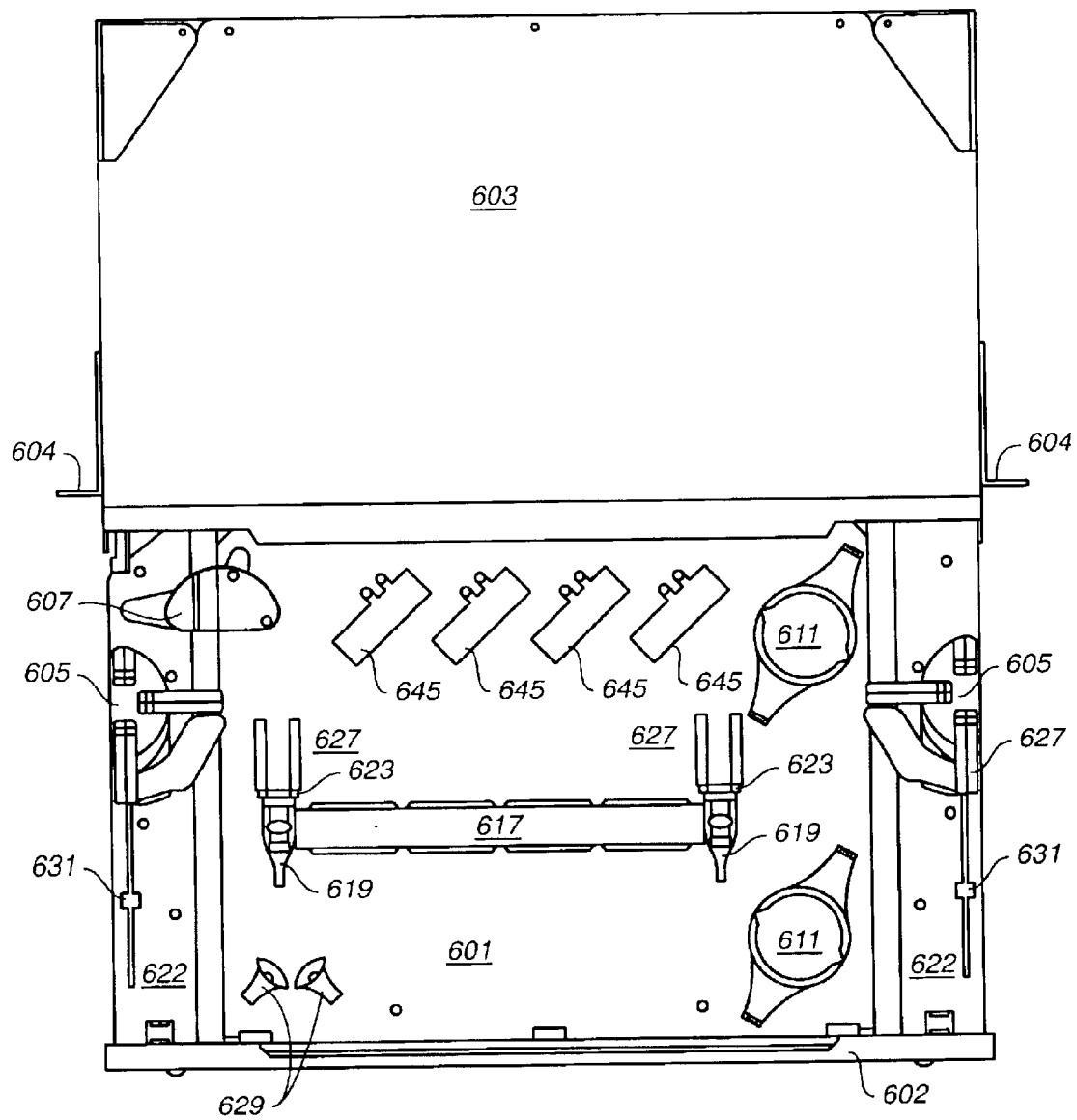
FIG._6B

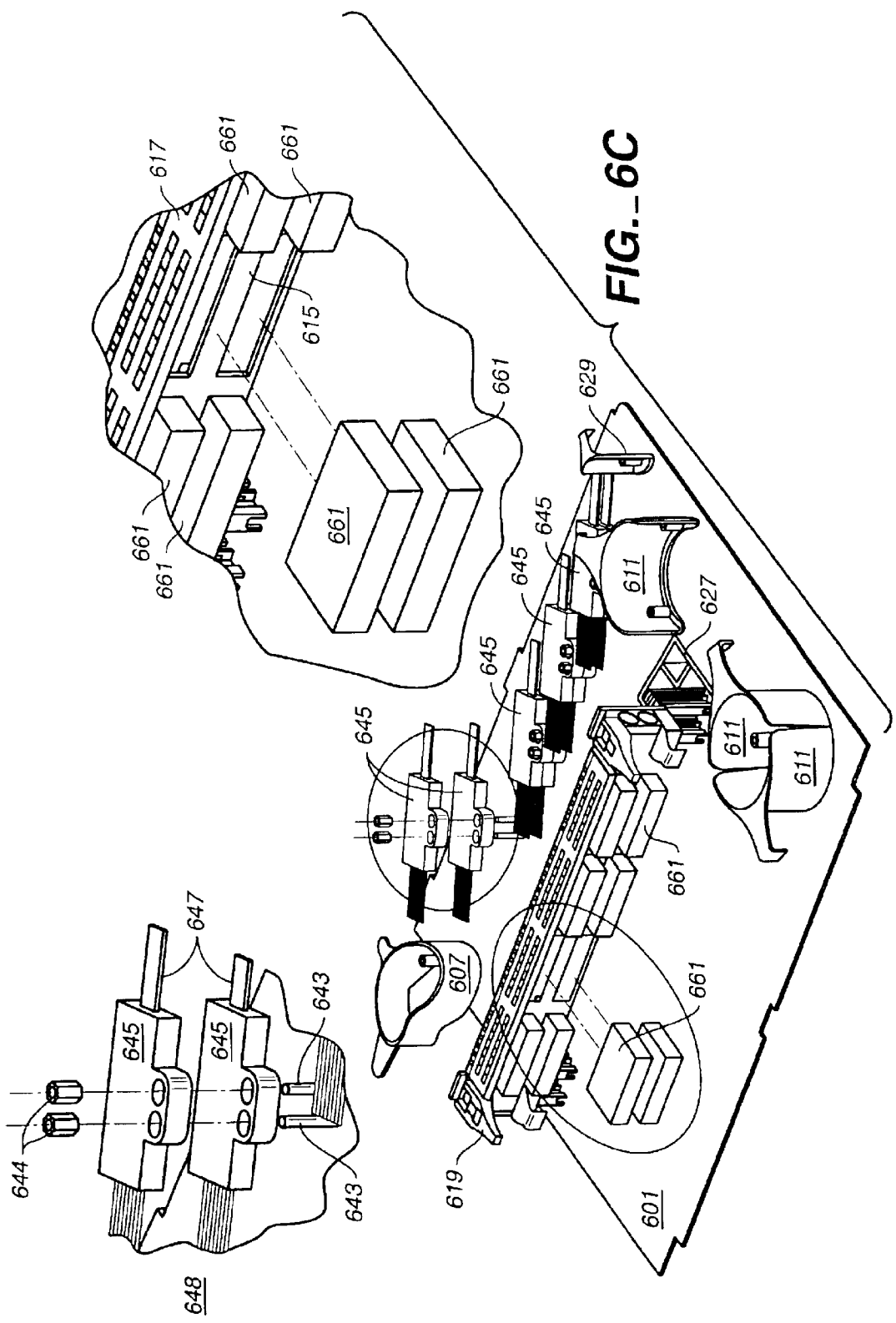

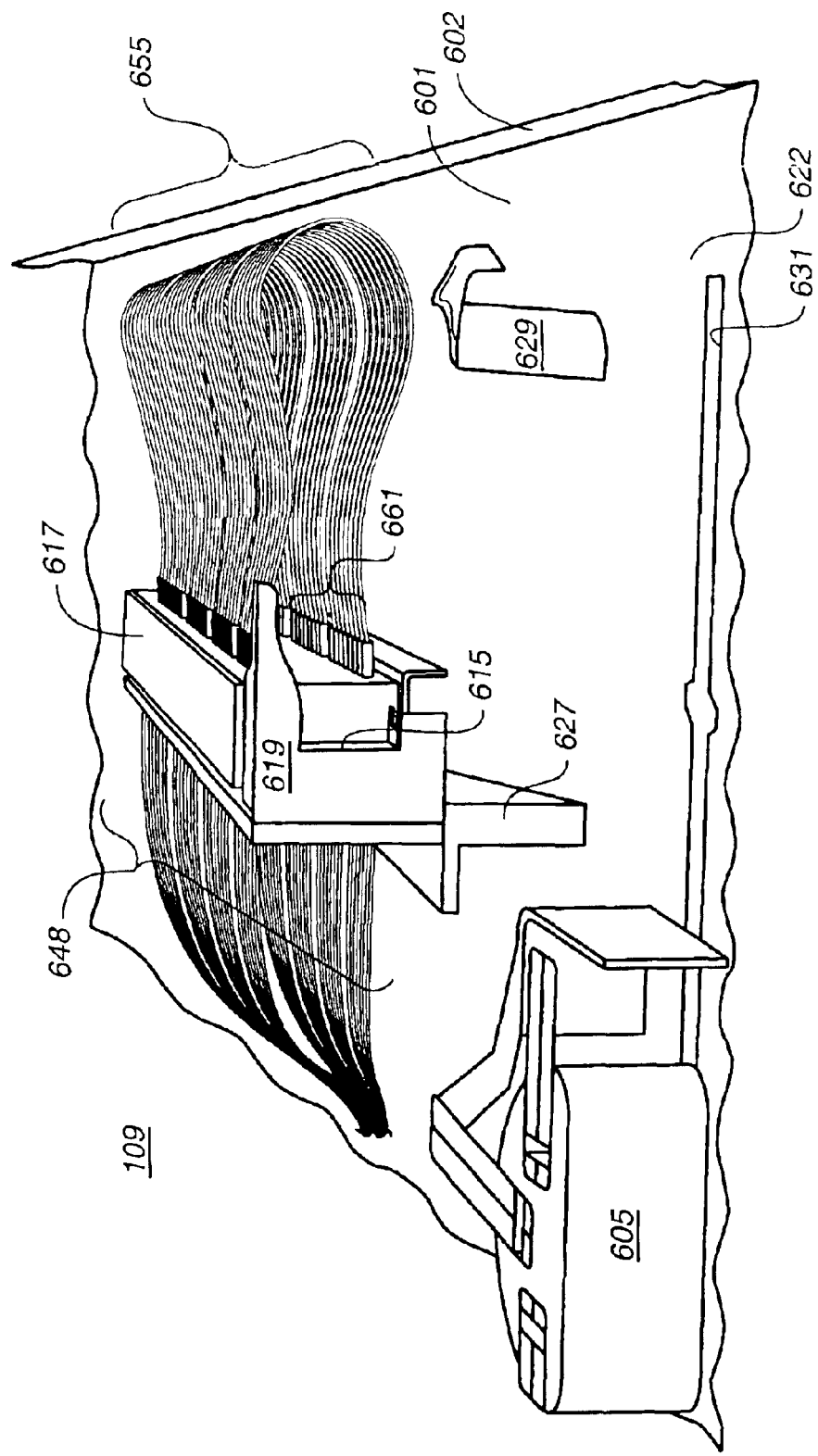
FIG._6D

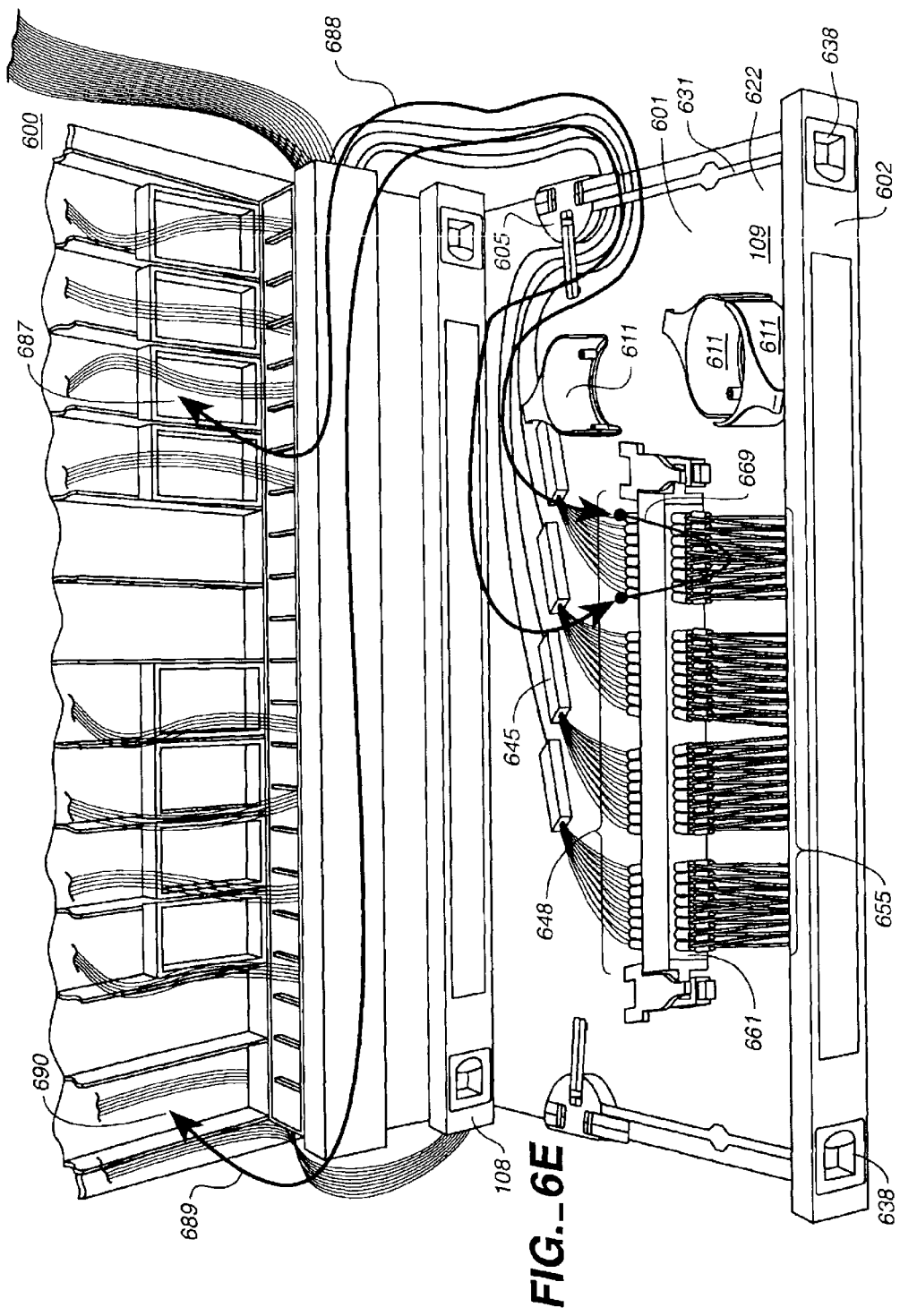
FIG._6E

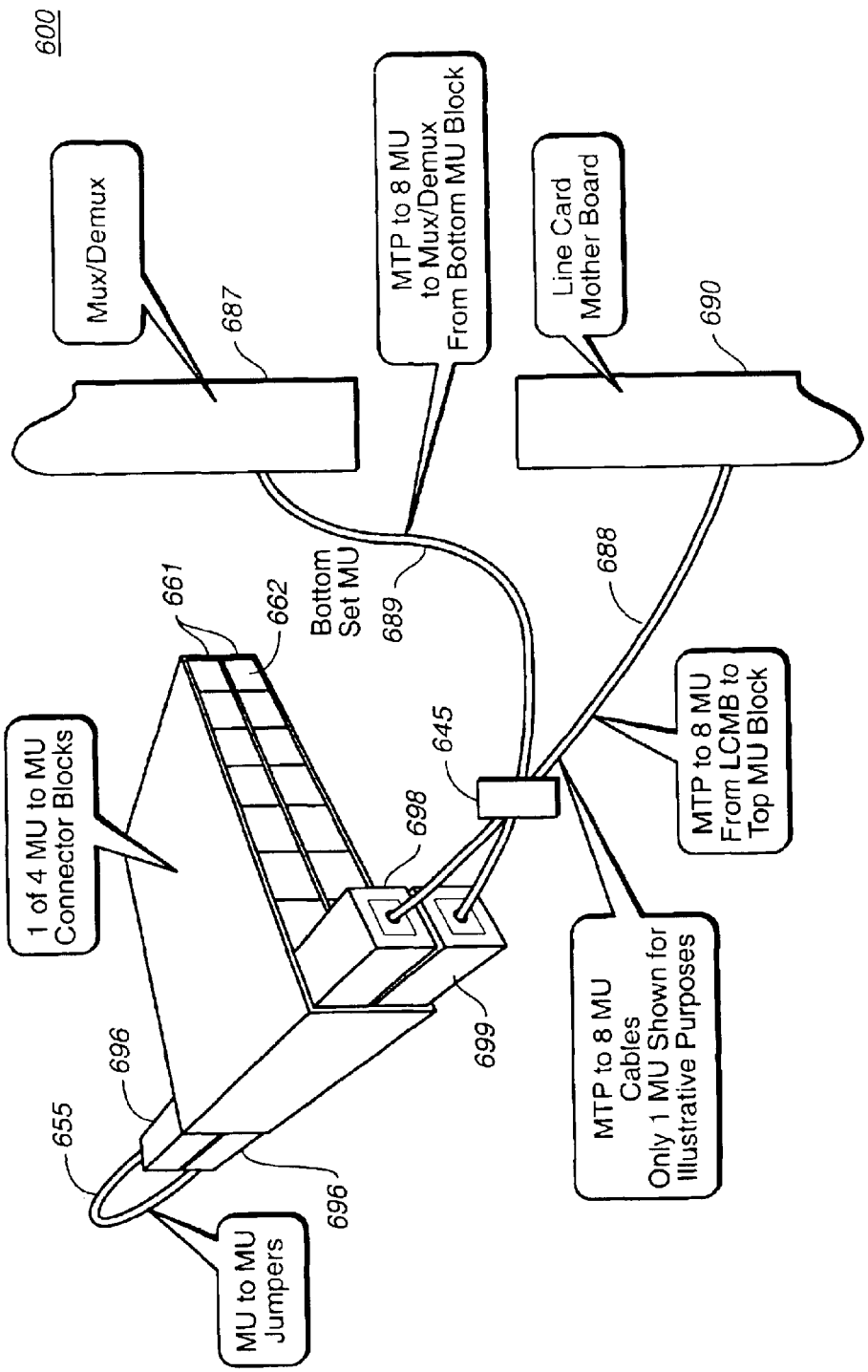
FIG._6F

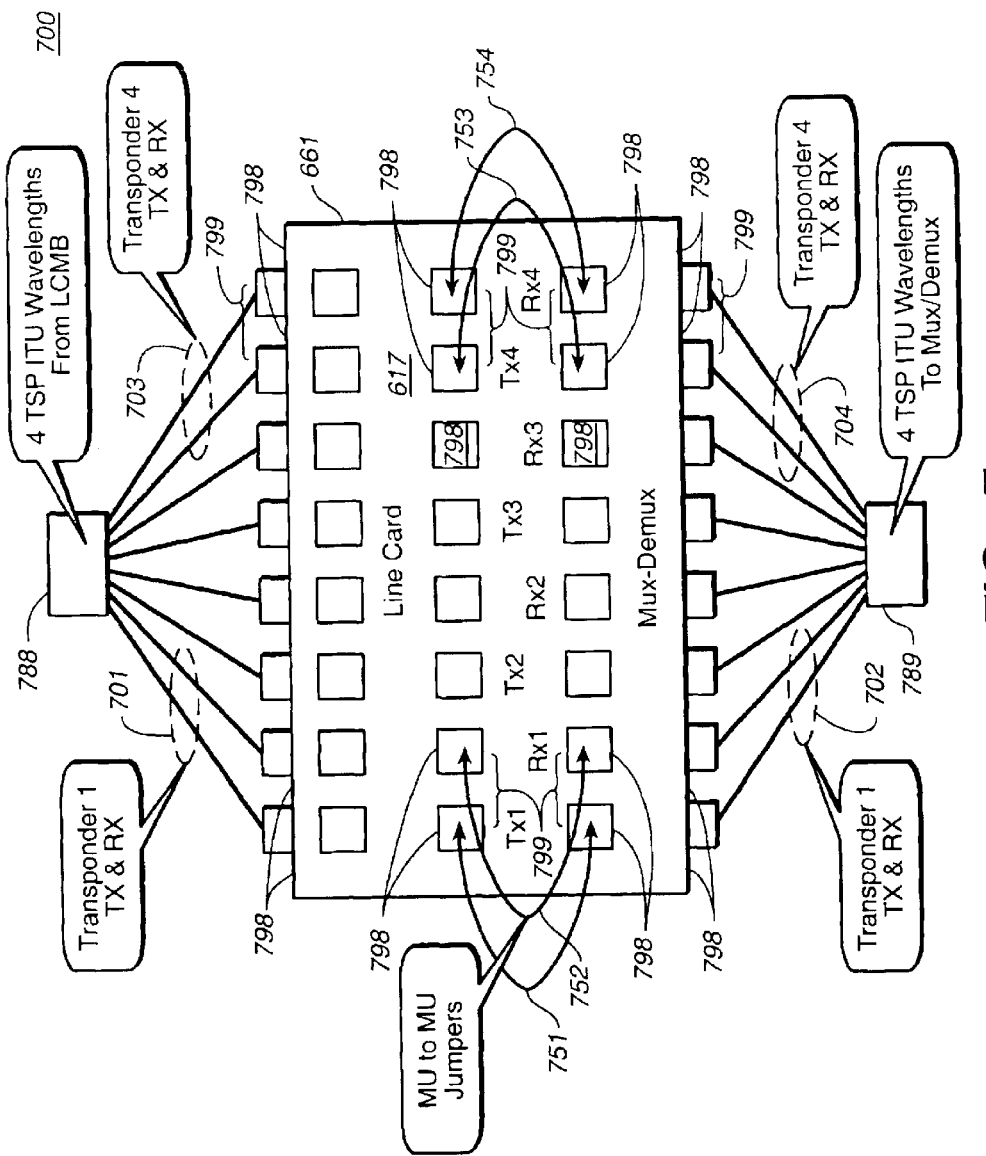
FIG._7

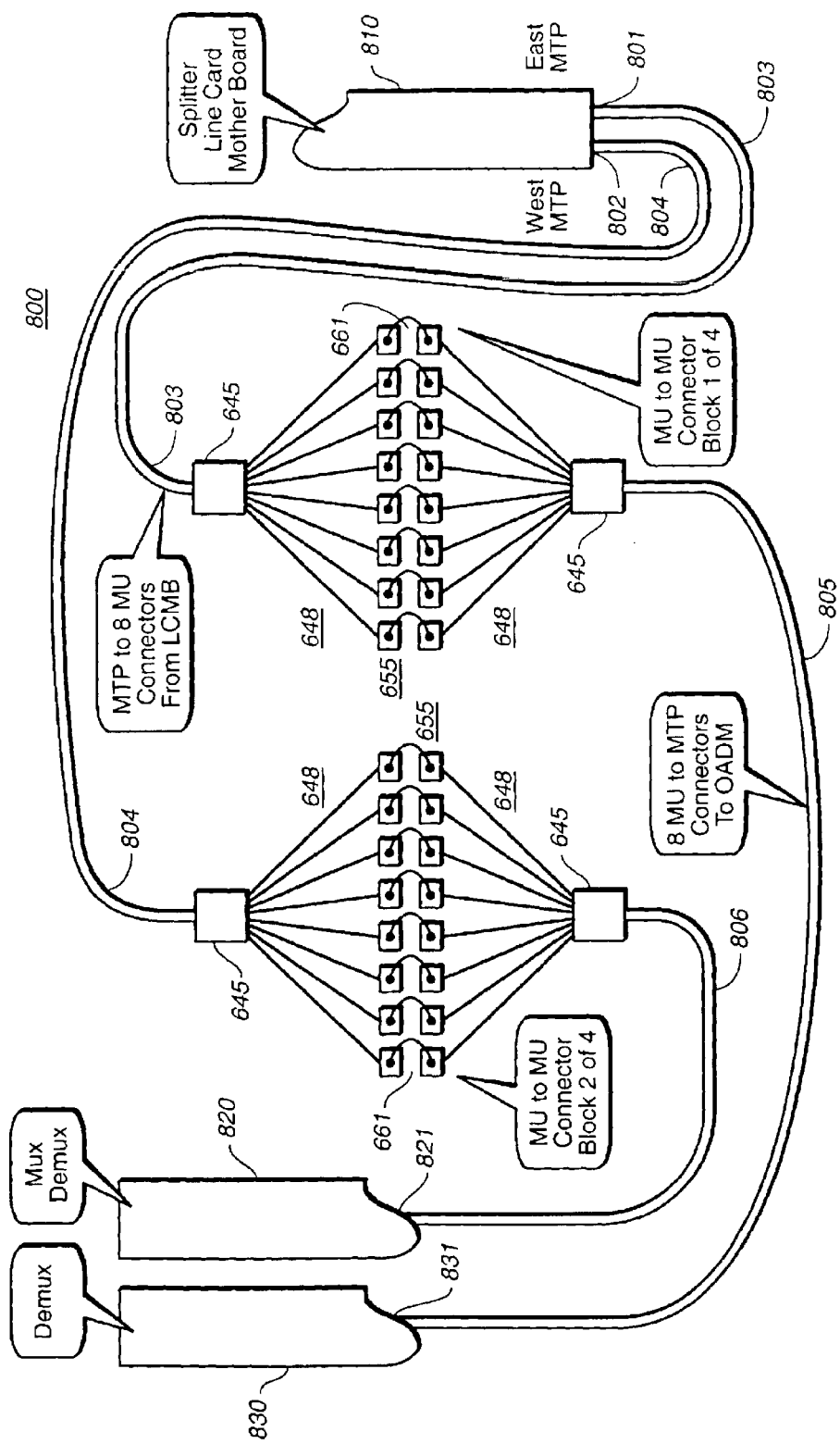
FIG._8

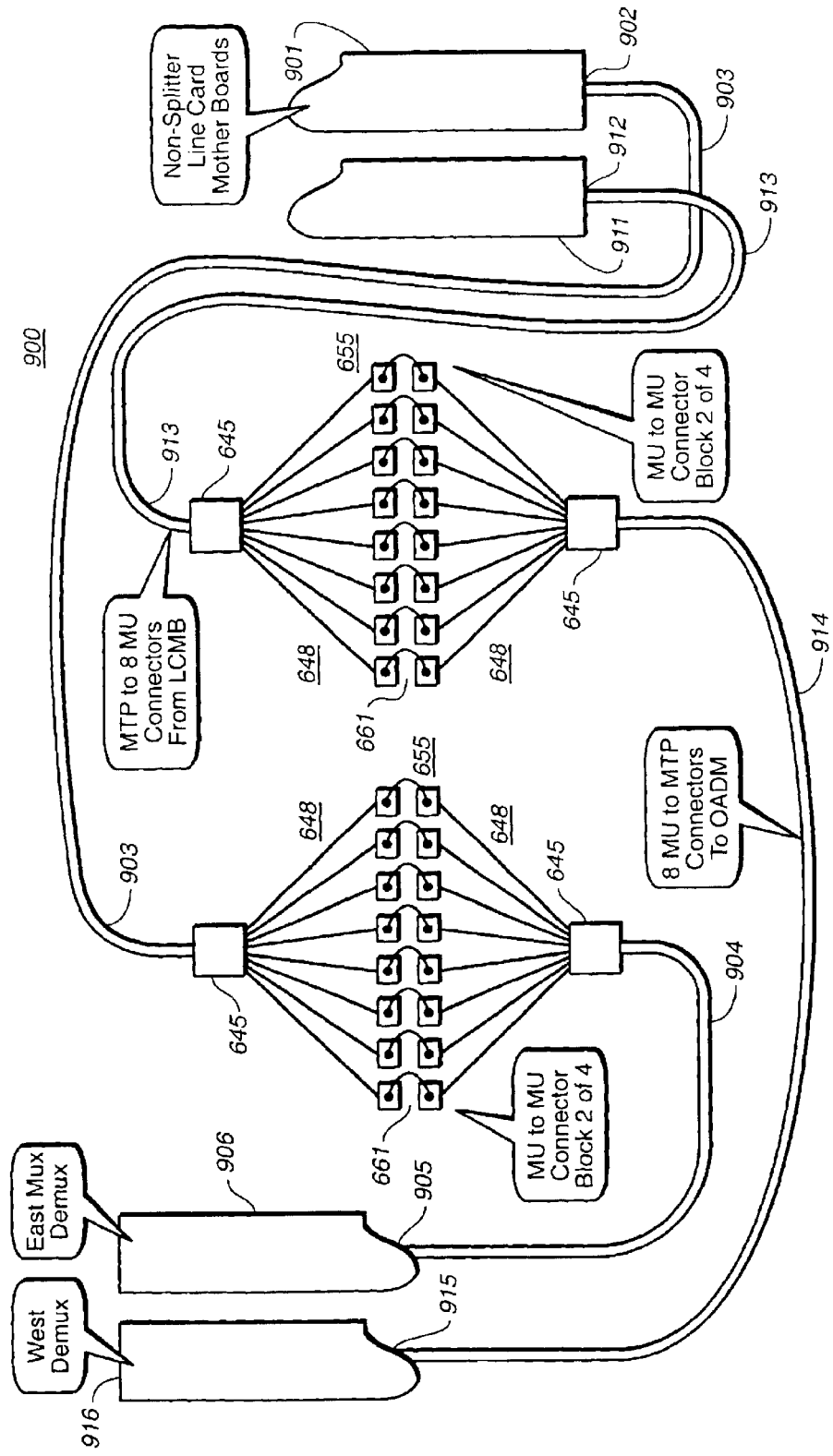
FIG._9

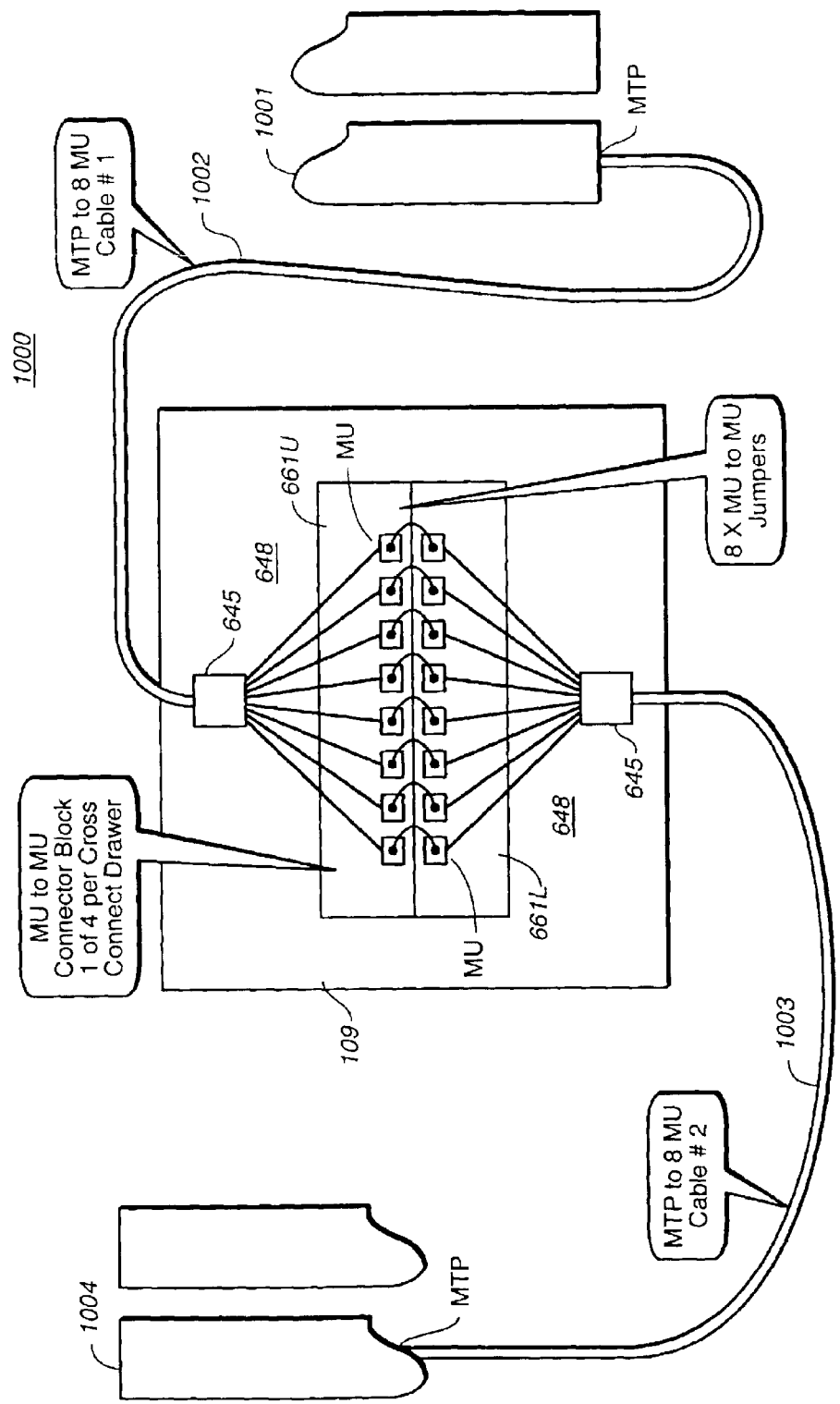
FIG._10

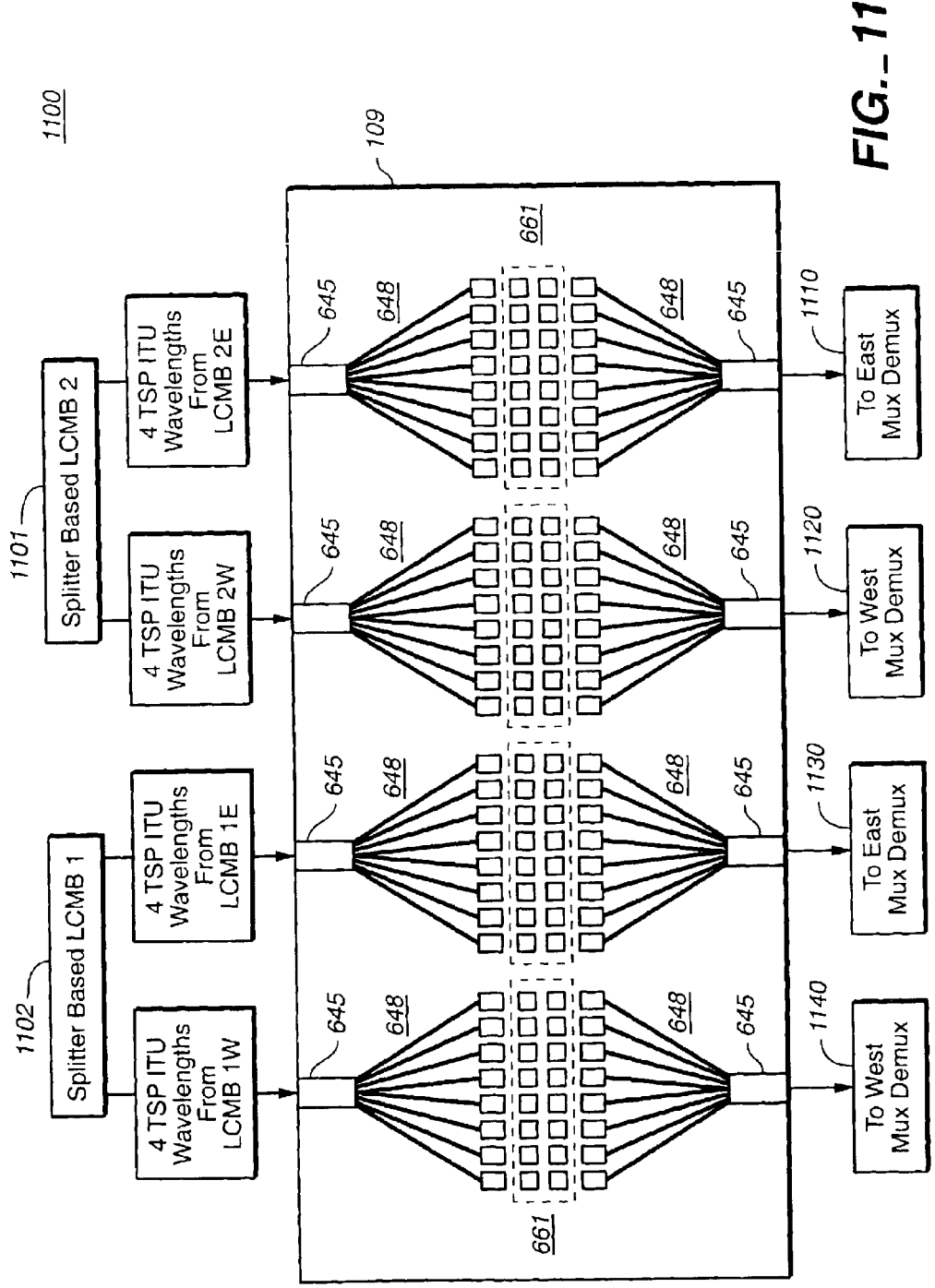
FIG._11

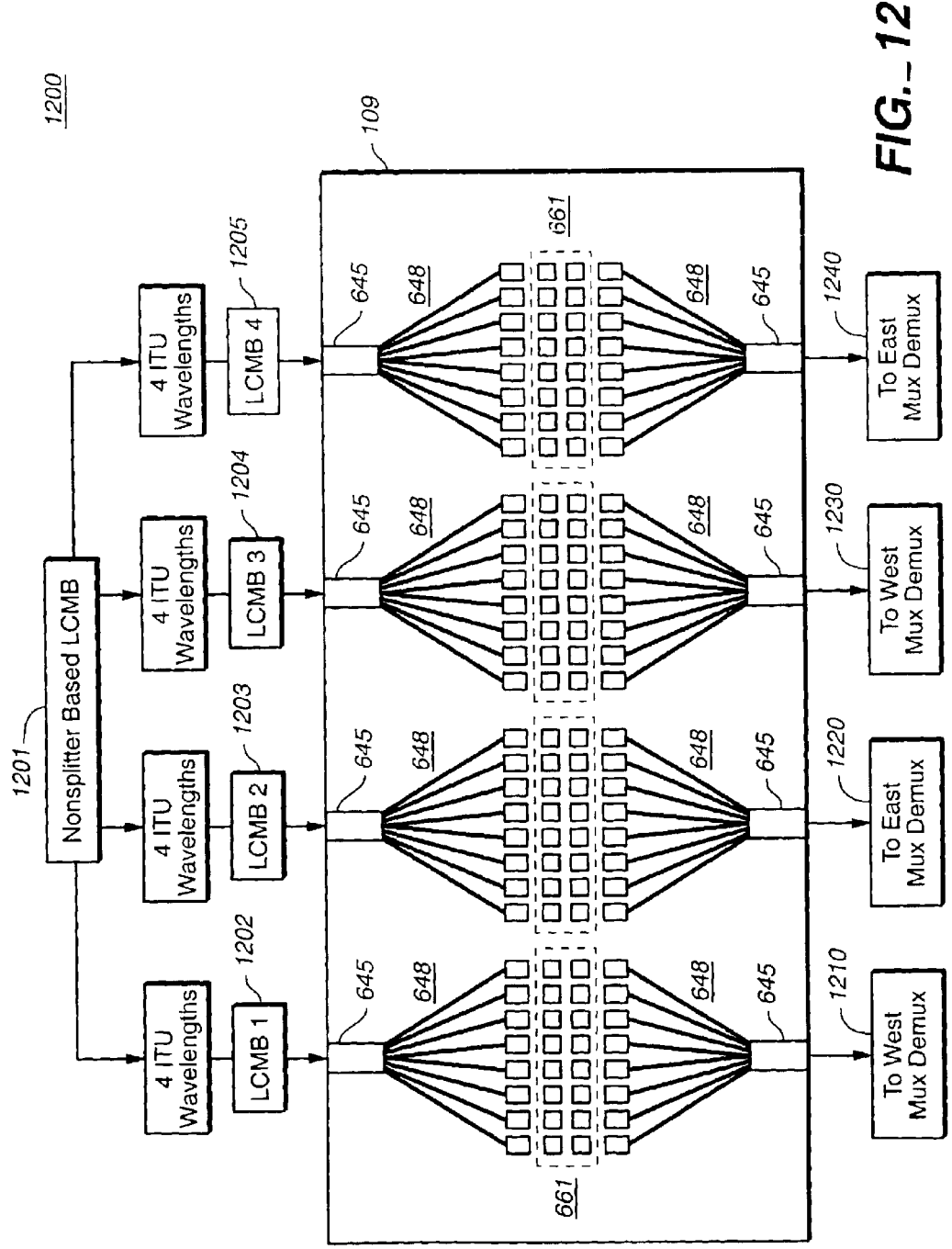

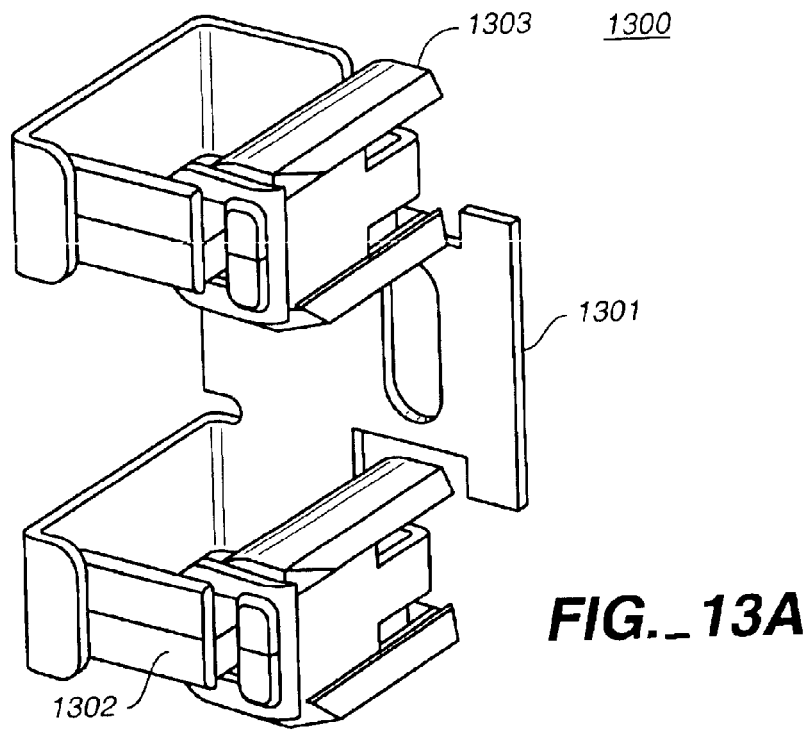
FIG._13A
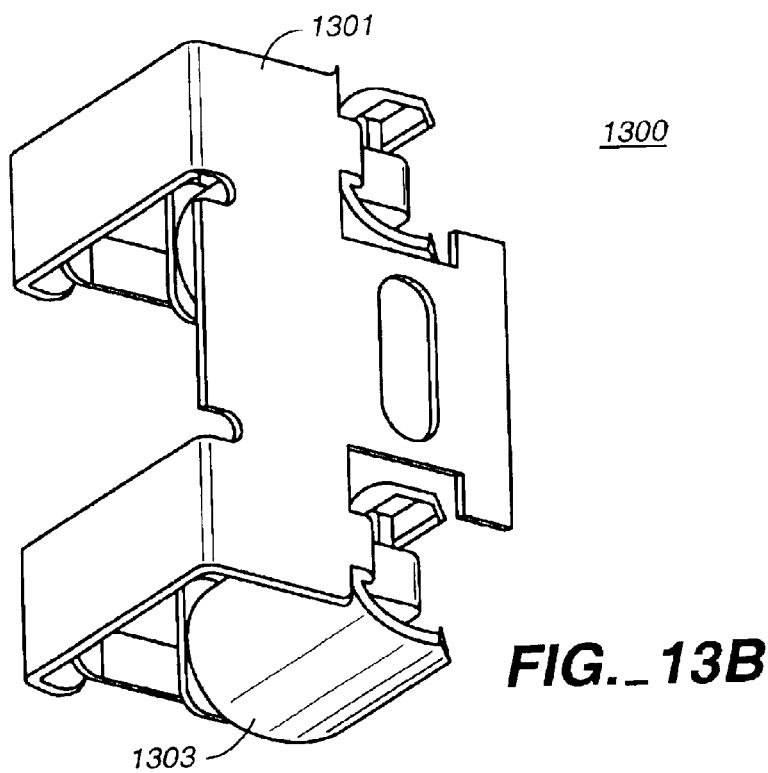
FIG._13B

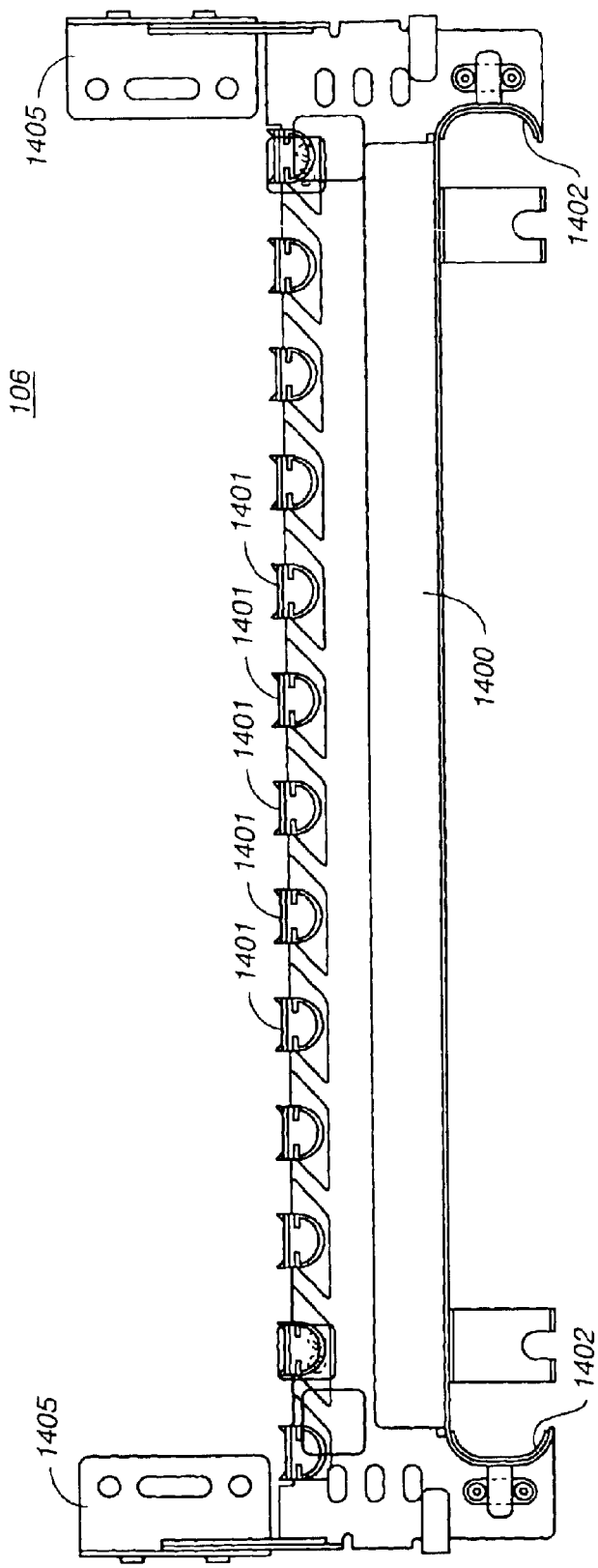
FIG._14

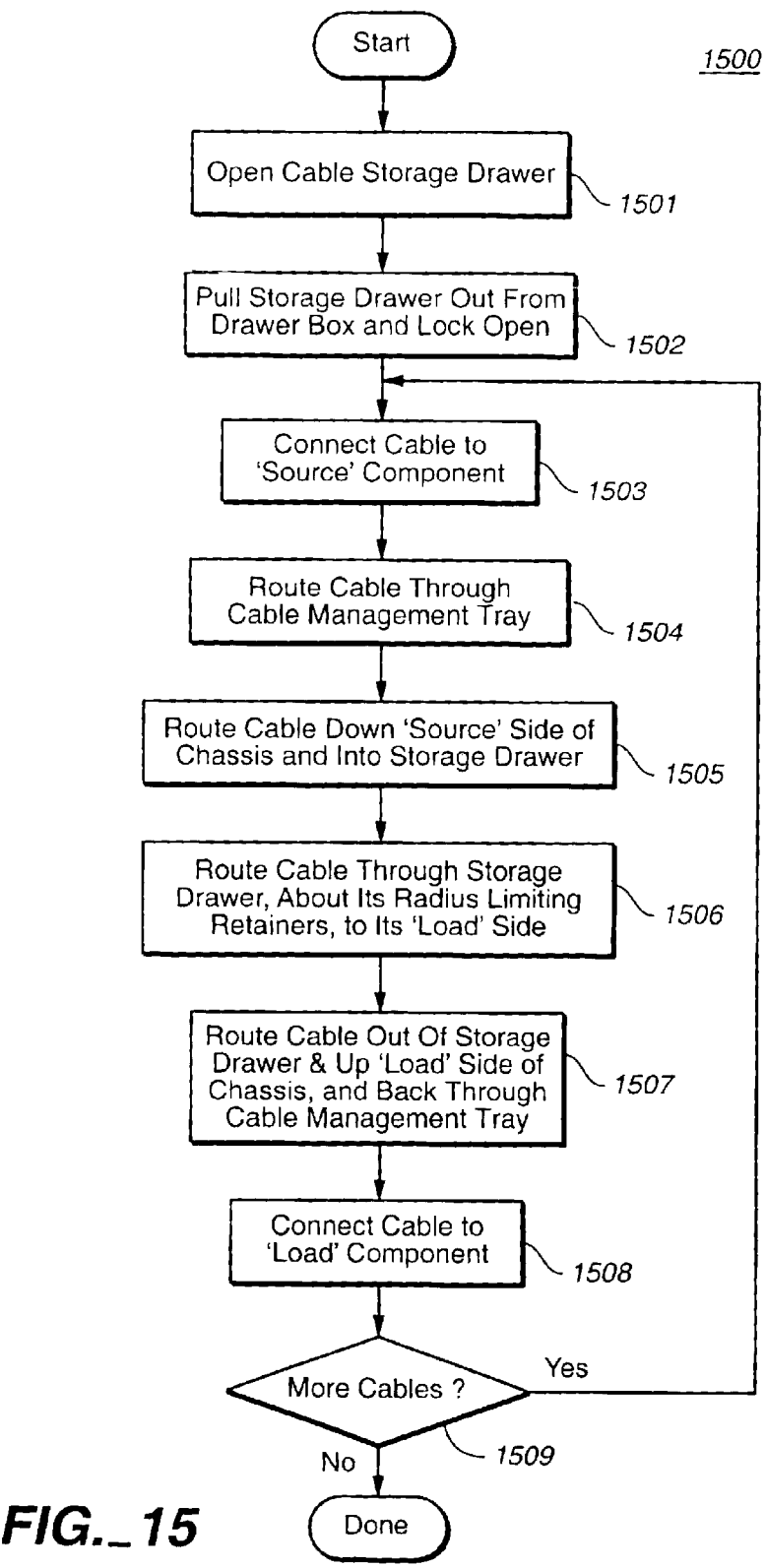
FIG._15

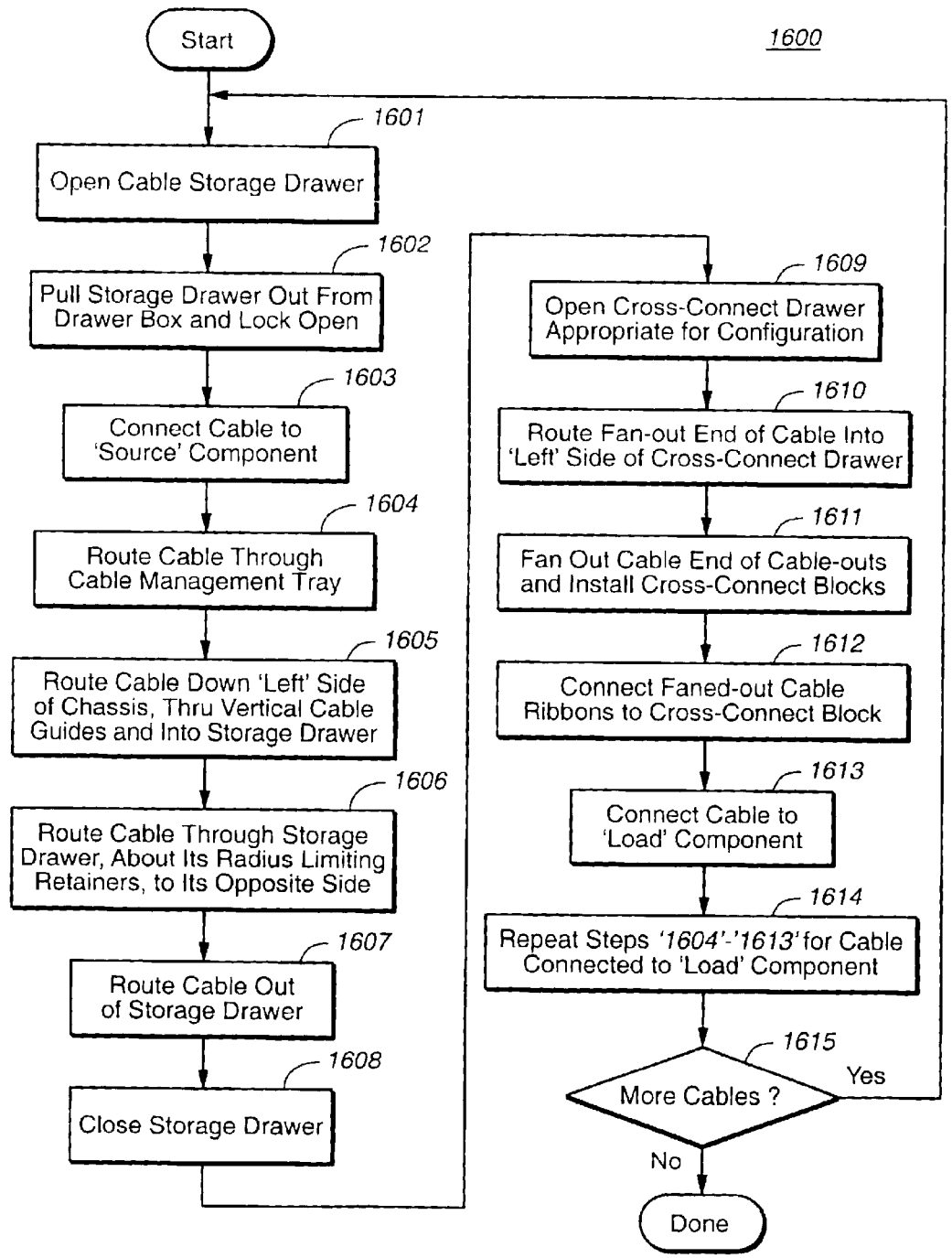
*FIG._16*

APPARATUS FOR CABLE ROUTING MANAGEMENT

TECHNICAL FIELD

Embodiments of the present invention relate to the field of cable routing. Specifically, embodiments of the present invention relate to an apparatus for managing the routing of cables.

BACKGROUND OF THE INVENTION

Electrical and/or optical signals, data, and power flow through and between various equipment. A signal transmitted by transmitting equipment is directed to receiving equipment, for instance. The signal is conducted from the transmitter to the receiver via transmissive media. Such transmissive media include optically or electrically conductive cables. Within an individual piece of equipment, a signal may be routed between various modules, also via cables.

The routing of signals and data between and within equipment is an important aspect of many operations. Modern networking, telecommunications, data processing, instrumentation, and related endeavors are heavily dependent upon the transmission of data via optical media, such as fiber optics cable. These optical media typically originate, terminate, and/or flow between modules, assemblies, drawers, cabinets, and similar equipment mounted in platforms of various types.

The use of multiplicities of cables are not atypical in such applications. Management of the physical routing of fiber optic cables entering and leaving an installation and the routing of fiber optic cables between modules and components therein is an important engineering consideration. Cable routing management thus impacts the assembly, alteration, maintenance, and other aspects related to networking, telecommunications, data processing, and related equipment and installations.

In installations with multiplicities of cables entering, leaving, and routed internally between modules and/or components therein, cable routing management can pose a formidable challenge. For example, one modern networking tower style installation design has numerous entering and egressing fiber optic cables and features a number of modules and line cards which are interconnected by over 256 fiber optic cables.

Many of the fiber optic cables in the exemplary tower design are terminated on interface line cards, mounted primarily in the backplane of the tower. Fiber optic cables optically interconnect various of the linecards, as well as optical transponder and multiplexer/demultiplexer (Mux/Demux) modules. Conventionally, the cables are routed so that the interconnections can be made, not on the backplane, but in the front of the tower for accessibility.

Given the number of fiber optic cables being thus routed, and the different permutations characterizing possible interconnections, the lengths and routing paths of the various fiber optic cables can differ, some significantly. Even during initial installation, the differences in cable length and routing paths pose a challenge for cable routing management that can result in neatness problems. This can be exacerbated, sometimes significantly, during cable re-routing associated with alteration and maintenance.

Sound engineering practice dictates routing the cables in a way that exemplifies good workmanship; neatness counts for several reasons. Routing the cables in such a way that their array is not neat can cause confusion to installation, alteration, and maintenance technicians. Confusion can be costly, because it requires time and effort from such technicians on activities such as cable tracing, that could probably be spent more profitably. Confusion can also result in erroneous terminations being made.

Incorrect terminations can also be costly for several reasons. Erroneously terminated cables can result in misrouted signals, data, etc. This can cause improper operation or failure of the equipment. Incorrect termination is also costly because it must be corrected, requiring troubleshooting, cable tracing, and other activities, further requiring time and effort from technicians that could probably be spent more profitably.

Routing the cables in such a way that their array is not neat can also cause bundling, "rat's nests", stretched cables and connectors, and other conditions. These conditions can be problematic for several reasons. Such conditions can cause damage. Excessive bundling can result in damaging squeezing of cables, such as between structural members of the installation. Stretched cables and terminations can result in changing optical or electrical characteristics of the cables, separation from connectors, and determinating of the connector from terminals.

Excessive bundling and rat's nests can also restrict access to some of the cables, as well as to modules and other internal components. Restricted access can lead to additional efforts required during alterations, maintenance, and even later stages of assembly, as excessively large cable bundles and rat's nests must be negotiated to re-route extant cables and/or add new ones. Such efforts can result from increased confusion, as described above. The cost of such added required efforts can be significant.

Further, restricted access due to excessively bundled cables, rat's nests, and other problems can result in placing a limitation on the flexibility and expandability of the installation. The difficulty of adding cables to and routing cables through bundles already excessive and/or rat's nests deters, delays, and discourages alteration and addition. Alterations and additions made under these circumstances can be costly because of the additional efforts they require.

Thus, the differences in cable length and routing paths, and other aspects typical of conventional cable routing and management can cause problems related to neatness and workmanship. Confusion arising from these differences can cause termination errors which can lead to operational problems and failures. Such confusion, problems and failures can be costly. Efforts made to correct the errors can also be expensive.

Cable routing configurations that can arise under these circumstances can cause damage, which can be costly. Such configurations can restrict access, requiring additional efforts during installation, alteration, and maintenance, which also raise costs. Further, cable routing configurations that can arise using conventional cable routing and management can pose obstacles deterring aspects of further installation and alteration. Such obstacles can limit flexibility and expandability.

SUMMARY OF THE INVENTION

An apparatus for managing the routing of a cable intercoupling two components in an installation is disclosed. The apparatus has a drawer for storing a portion of the cable and a drawer for cross-connecting the cable, which is connected to one component, with another cable, which is connected to the other component. The apparatus can be used with optical and electrical cables.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 depicts an installation incorporating an embodiment of the present invention.

FIG. 2A depicts a view of a cable storage drawer with a baseplate lifted out, according to one embodiment of the present invention.

FIG. 2B depicts a top view of a cable storage drawer, according to one embodiment of the present invention.

FIG. 3A depicts a cable storage drawer with cable routed there through in a serpentine configuration, according to one embodiment of the present invention.

FIG. 3B highlights the serpentine path of a cable through a cable storage drawer, according to one embodiment of the present invention.

FIG. 4 depicts a direct connection through a cable storage drawer from a splitter LCMB to a Mux/Demux, according to one embodiment of the present invention.

FIG. 5 depicts a direct connection through a cable storage drawer from two non-splitter LCMBs to a Mux/Demux, according to one embodiment of the present invention.

FIG. 6A depicts a cross-connect drawer with a base plate lifted out, according to one embodiment of the present invention.

FIG. 6B depicts a top view of a cross-connect drawer, according to one embodiment of the present invention.

FIG. 6C depicts a view of a cross-connect drawer, showing details of the fan-outs and cross-connect block placement, according to one embodiment of the present invention.

FIG. 6D depicts a view of a cross-connect drawer, showing jumpers connected to the cross-connect blocks, according to one embodiment of the present invention.

FIG. 6E depicts the routing of a pair of cables through a cross-connect drawer, according to one embodiment of the present invention.

FIG. 6F depicts a cross-connection through a cross-connect block, according to one embodiment of the present invention.

FIG. 7 depicts cross-connecting a pair of cables through a cross-connect block, according to one embodiment of the present invention.

FIG. 8 depicts cross-connecting a splitter LCMBs and two Mux/Demux modules, according to one embodiment of the present invention.

FIG. 9 depicts cross-connecting two splitter LCMBs and two Mux/Demux modules, according to one embodiment of the present invention.

FIG. 10 depicts cross-connecting two cables via fanned-out ribbons, a cross-connect block, and jumpers, according to one embodiment of the present invention.

FIG. 11 depicts cross-connecting two splitter LCMBs and two Mux/Demux modules via four cross-connect blocks, according to one embodiment of the present invention.

FIG. 12 depicts cross-connecting a non-splitter LCMB and two Mux/Demux modules via four cross-connect blocks, according to one embodiment of the present invention.

FIGS. 13A and 13B depict a vertical cable guide, according to one embodiment of the present invention.

FIG. 14 depicts a cable spreading tray, according to one embodiment of the present invention.

FIG. 15 is a flowchart of the steps in a process for directly connecting modules, according to one embodiment of the present invention.

FIG. 16 is a flowchart of the steps in a process for cross-connecting modules, according to one embodiment of the present invention.

FIGS. 1–16 are drawn for illustrative purposes and are not necessarily drawn to scale. Where scales and/or measurements are used herein, they are for exemplary and illustrative purposes only. Embodiments of the present invention are well suited for practice using measurements different from those shown.

FIGS. 1–17 are drawn for illustrative purpose and are not necessarily drawn to scale. Where scales and/or measurements are used herein, they are for exemplary and illustrative purpose only. Embodiments of the present invention are well suited for practice using measurements different from those shown.

DETAILED DESCRIPTION OF THE INVENTION

Figure 17:
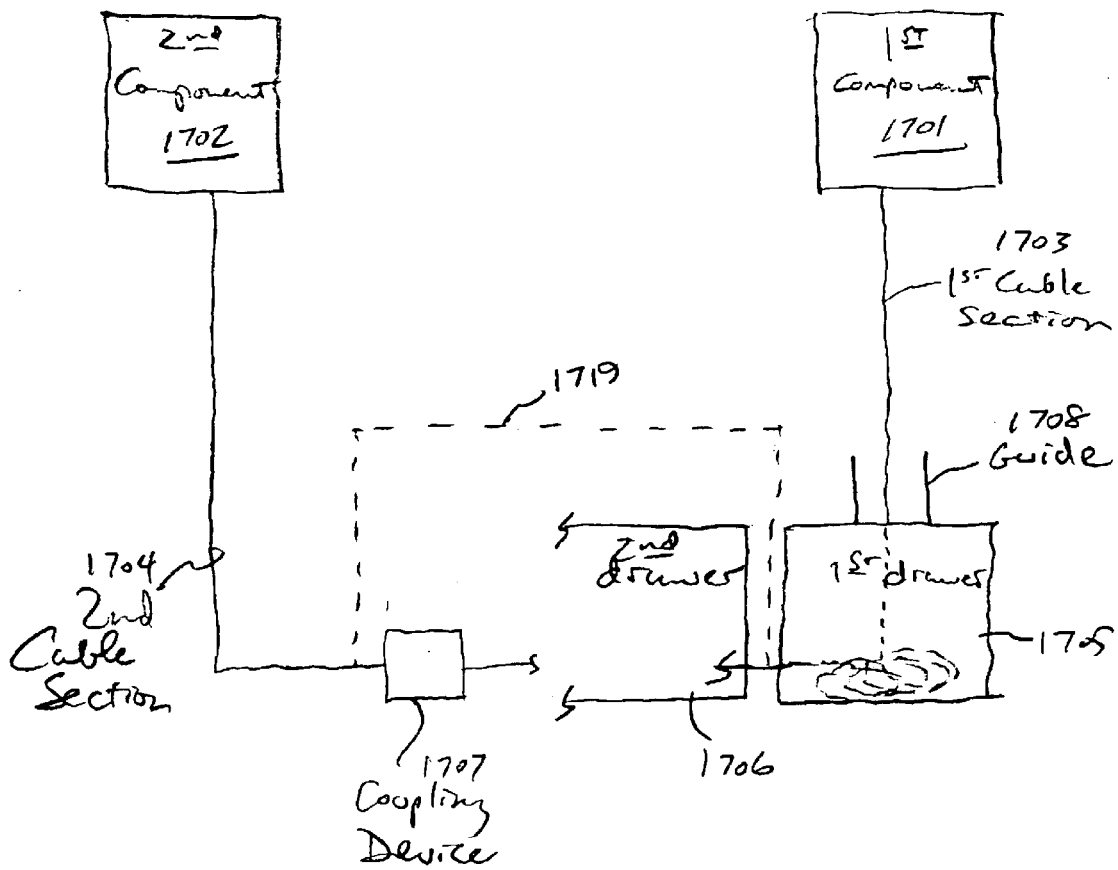
FIG. 17 depicts an exemplary apparatus for cable routing management, according to one embodiment of the present invention.

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well known components, methods, materials, and procedures have not been described in detail so as not to unnecessarily obscure aspects of the present invention. Embodiments of the present invention are discussed primarily in the context of an apparatus for cable routing management.

An apparatus for managing the routing of a cable intercoupling two components in an installation is disclosed. The apparatus has a drawer for storing a portion of the cable and a drawer for cross-connecting the cable, which is connected to one component, with another cable, which is connected to the other component. The apparatus can be used with optical and electrical cables.

Therefore, the problems of differing cable lengths, routing paths, and other neatness and workmanship aspects of conventional cable routing and management are ameliorated. Costly damage, and confusion leading to termination errors and associated laborious correction efforts are averted by embodiments of the present invention. Accessibility, flexibility, and expandability are enhanced by an embodiment of the present invention, with corresponding economic and other benefits.

Exemplary Cable Management Patch Drawer Apparatus

Exemplary Networking Installation

With reference to FIG. 1, an exemplary networking cabinet 100 is depicted. Networking cabinet 100 is a chassis-mounted installation. Its components are housed in chassis 101, which provides structural and mechanical support and electrical grounding. Networking cabinet 100 has a multiplicity of fiber optic cables 110 entering and leaving mounted in chassis 101, as well as interconnecting modules and components therein.

Networking cabinet 100 can be an optical router, for instance. Networking cabinet 100 and its fiber optic cables are exemplary, illustrating one embodiment of the present invention. Embodiments of the present invention are well suited for installations in other applications, including but not limited to for example, telecommunication, instrumentation and control, data processing, computing, and relaying installations.

Further, embodiments of the present invention are well suited for the management and routing of cables besides the fiber optics shown. Such cables can include, but not limited to for example, control wiring, signal routing and instrumentation leads, shielded cable, coaxial cable, twisted pairs, telephonic conductors, and other types of fiber optics.

The fiber optics of exemplary networking cabinet 100 interconnect modules and components such as optical Mux/Demux modules, line cards, optical transponders, and other modules and components. Networking cabinet 100 is depicted from a view of its front end, which is accessible for assembly, alteration, and maintenance. Networking cabinet 100 also has a back plane and sides not shown. An embodiment of the present invention allows the convenience of front end accessibility.

Mux/Demux motherboard 102 is over Mux/Demux modules 103. Line card motherboard 104 is mounted near Mux/Demux motherboard 102, in the same vertical region of networking cabinet 100. Transponders 105 are mounted near Mux/Demux modules 103, in the same vertical region of networking cabinet 100.

A series of drawers and trays are mounted in the lower vertical region of networking cabinet 100. Cable management tray 106 is positioned over fan tray 107 to manage cables emerging and/or entering the region of the installation housing the modules and components and effectively serve as a cable origin and terminus raceway. Beneath these trays are two sets of drawers. Each set of drawers has a cable storage drawer 108 and two cable cross connect drawers 109. Vertical cable guides 1300 provide protection and bundling.

In one embodiment, two techniques can be applied to interconnect line card motherboard (LCMB) 104 with Mux/Demux module 103. A direct connection can be made to couple signals from each LCMB 104 to specific Mux/Demux modules 103. This direct connection is made via cable storage drawer 108. Cables of a uniform length can be used. In the present illustration, cables are all 86 inches long, and are terminated at each end by optical connectors, which can be of the Multiple Terminations, Push-Pull Latch ('MTP'™) type, the Multiple Terminations, Push-Pull Off ('MPO'), or another type.

Beside direct connection, LCMB 104 can be interconnected with Mux/Demux module 103 by cross connection. By this technique, the interconnection is effectuated over a fiber optic cable having for example a type 'MTP', or e.g., an 'MPO' connector, a Mechanically Transferable Ferrule, Register Jack Latch ('MT-RJ') type, or another type of optical connector on the LCMB 104 terminal. The signals on the 'MTP' terminated cable is split into eight individual channels connected in cross connect drawers 109 and routed from the cross connect drawer 109 to specific Mux/Demux modules 103 on an individual basis via fiber optic cables having connectors of various types, such as Miniature Unit ('MU') type or e.g., Subscriber Connector ('SC') type, Lucent Connector ('LC') type, MT-RJ type, or another connector type.

Exemplary Cable Storage Drawer

FIG. 2A depicts an exploded view and FIG. 2B a top view of open exemplary cable storage drawer 108, according to one embodiment of the present invention. Cable storage drawer 108 has a frame 202, which is comprised of a faceplate 220, a backplate 221, and two sliding lateral members 222. Sliding member 222 can slide in and out of drawer box 203 on rollers or another mechanism. Frame 202 is secured within framebox 203 by a mounting bracket 204, which also allows drawer 108 to be secured within an installation (e.g., networking cabinet 100; FIG. 1).

Baseplate 201 fits within frame 202 and mounts several fixed radius limiters 211, about which cables such as fiber optics cables can be bent. Baseplate 201 also mounts several adjustable storage brackets 209, upon which versatile radius limiters 207 can be adjusted as to bend radius and/or tension for cables bent thereon. A tightening knob 210 allows an adjusted radius of versatile radius limiter 207 to be securely fixed. Movable radius limiter 205 is affixed to sliding members 222 by a bracket 206.

Clips 208 prevent bent-on cables from rising up from versatile radius limiters 207 and/or from movable radius limiters 205 during movement of drawer 108, and/or during assembly, alteration, and maintenance therein. A similar function is performed by brackets 213 on each of the fixed radius limiters 211. Latches 238 securely latch drawer frame 202 within drawer box 203, and allow it to be unlatched for removal therefrom.

Cable is lead into cable storage drawer 108 and run therein by bending about the various radius limiters in any configuration necessary to achieve a neat and workmanlike route such that slack and excessive bundling is minimized. Advantageously, this allows the use of cables of uniform lengths for all interconnections between components and/or modules in an installation, no matter where on the installation front plane they are located.

Exemplary Direct Cable Connections

FIG. 3A depicts cable storage drawer 108 in an open position (e.g., drawer frame 202 withdrawn from drawer box 203 with a neat, well-routed bundle 303 of fiber optic cables routed through the drawer and configured in such a way as to directly connect LCMB 302 with Mux/Demux motherboard module 301. FIG. 3B depicts a route 399 illustrating this direct interconnection.

Route 399 illustrates the routing of a cable of bundle 303 from a type 'MTP' optical connector terminated at LCMB 302, through cable management tray 106 and/or fan tray 107, and into drawer frame 202. Within drawer frame 202, the cable of bundle 303 following route 399 bends backward around the movable radius limiter 205 on the right side (as viewed).

From the right side movable radius limiter 205, the cable following (e.g., of) route 399 is bent forward around the right side versatile radius limiter 207. The cable of route 399 then bends backwards around the forward most fixed radius limiter 211, and bends left around the right rear fixed radius limiter 211.

From this point, within drawer frame 202, route 399 along which the cable of bundle 303 runs mirrors the right side pathway. For instance, following route 399 sequentially, the cable bends forward around the left rear fixed radius limiter 211, backwards around left forward fixed radius limiter 211, and forward around versatile radius limiter 207, its routing thus having an essentially serpentine configuration.

The cable of bundle 303 following route 399, bends backwards and out of drawer frame 202 around moveable radius limiter 205. The cable then runs through fan tray 107 and/or cable management tray 106. Another type 'MTP' optical connector (e.g., on the opposite end from the connector terminated on LCMB 302) terminates on Mux/Demux module 301.

Flexibility in direct connections is enhanced by the variety of routes cables can take through cable storage drawer 108. This flexibility allows direct connections between various components and modules. For instance, referring to FIG. 4, an exemplary configuration 400 is depicted. Exemplary designations 'east' and 'west' are used herein for illustrative differentiation.

An 'east' cable 401 and a 'west' cable 402 are terminated on an exemplary 2.5 GByte splitter based LCMB 405. 'East' cable 401 follows route 410 and 'west' cable 402 follows route 420 through cable storage drawer 108. Routes 410 and 420 can follow any viable pathway around the various radius limiters (e.g., movable 205, versatile 407, fixed 411) therein.

After emerging from cable storage drawer 108, 'east' cable 401 terminates through another type 'MTP' connector on an 'east' Mux/Demux module 403. After its emergence, 'west' cable 402 terminates through another type 'MTP' connector on an 'west' Mux/Demux module 404. Each 'MTP' to 'MTP' cable 401 and 402 can support four optical transponders (not shown, integral to respective Mux/Demux modules 403, 404) by carrying four separate transmitter/receiver (Tx/Rx) signals.

The versatility is further illustrated by reference to FIG. 5, which depicts an exemplary configuration 500. A cable 510 is terminated by its type 'MTP' connector on an 'east' non-splitter based LCMB 501. Another cable 520 is terminated by its type 'MTP' connector on an 'west' non-splitter based LCMB 502.

'East' cable 501 follows route 510 and 'west' cable 502 follows route 520 through cable storage drawer 108. Routes 510 and 520 can follow any viable pathway around the various radius limiters therein. After emerging from cable storage drawer 108, 'east' cable 501 terminates through another type 'MTP' connector on an 'east' Mux/Demux module 503. After its emergence, 'west' cable terminates through another type 'MTP' connector on an 'west' Mux/Demux module 504.

Advantageously, despite differing positions of their various terminals, cables of uniform length are neatly routed in a workmanlike manner through cable storage drawer 202 to effectuate their various connections. It is appreciated that cables to be directly connected on other components and/or modules within installation 100 (FIG. 1) can follow any viable route around the various radius limiters through the drawer frame 202 of cable storage drawer 108 (FIGS. 1, 2).

Exemplary Cable Cross Connect Drawer

FIG. 6A depicts an exploded view and FIG. 26 a top view of open exemplary cable cross connect drawer 109, according to one embodiment of the present invention. Cable cross connect drawer 109 has a frame 602, which is comprised of a faceplate 620, a backplate 621, and two sliding lateral members 622. Sliding member 622 can slide in and out of drawer box 603 on rollers or another mechanism. Frame 602 is secured within framebox 603 by a mounting bracket 604, which also allows drawer 109 to be secured within installation 100.

Baseplate 601 fits within frame 602 and mounts several fixed radius limiters 611, a small radius limiter 629, and a dipping radius limiter 607 about which cables such as fiber optics cables can be bent. Baseplate 601 also mounts a cross connect drop-in plate bulkhead 615, which provides buttressing of connection blocks (e.g., connection blocks 661; FIG. 6C), and label plate 617 labels connections to be made thereon. Fastener 623 and divider fastener 627 attach such connection blocks, and sliding handle 619 allow their positioning against plate bulkhead 615.

Clips 608 prevent bent-on cables from rising up from movable radius limiters 605 during movement of drawer 109, and/or during assembly, alteration, and maintenance therein. A similar function is performed by brackets 613 on each of the fixed radius limiters 611. Standoffs 643 mount cable fan-outs (e.g., fan-outs 645; FIG. 6C).

Sliding lateral members 622 each have a slide slot 631 in which movable radius limiters 605 can be variably positioned. Movable radius limiter 605 is affixed to sliding members 622 by a bracket 606. Latches 638 securely latch drawer frame 602 within drawer box 603, and allow it to be unlatched for removal therefrom.

FIG. 6C depicts the contents of cross connect drawer 609 mounted on baseplate 601. In one embodiment, cross connect drawer 609 manages eight cables 647, each comprised of eight fiber optic ribbons 648 having type 'MU'(or e.g., types 'LC', 'SC', etc.) optical connectors for terminals. In the present embodiment, cross connect drawer 109 also manages 64 fiber optic jumper cables. In another embodiment, cross connect drawer 109 functions to cross connect electrical cables. Embodiments of the present invention are well suited to cross connect a variety of optical and/or electrical cables.

Components within cross connect drawer 109 help protect the slack cables therein by providing them with sufficient bend radii to comply with specifications for the cables. In the present embodiment, small radius limiter 629 provides a one inch bend radius for the slack cables.

Detail 'A' of FIG. 6C depicts optical connector blocks 661 securely positioned in slots 662 in cross connect drop-in plate bulkhead 615. Slots 662 are configured to position connector blocks 661 into either an upper or a lower tier.

Detail 'B' of FIG. 6C depicts cable fan-outs 645, mounted onto standoffs 643 and secured by nuts 644. Fan-outs 645 help maintain a proper distancing and protective bend radii for cables within drawer frame 602.

A cable 647 enters fan-out 645 where it is secured such that each of its eight fiber optic ribbons 648 are neatly fanned in a workmanlike manner towards an appropriate connection block 661.

FIG. 6D depicts a side view of an open cross-connect drawer 109 showing the ribbons 648 terminated on the back-facing side of connection blocks 661. Ribbons 648 terminated on one tier (e.g., upper or lower) are optically linked to other ribbons, which can be on the opposing tier.

This optical link is effectuated in one embodiment by fiber optic jumpers 655, each terminated on the front-facing side of connection blocks 661. Jumpers 655, in the present embodiment, are terminated on both ends by type 'MU'(or e.g., types 'LC' or 'SC', etc.) optical connectors.

In another embodiment, electrical leads are fanned out of a cable and terminated in the connection blocks, which provide electrical connections. These leads are electrically interconnected by electrical jumpers. Embodiments of the present invention are well suited to cross connect a variety of optical and/or electrical cables.

Exemplary Cross Connections

FIGS. 6E and 6F depict an exemplary configuration 600 wherein LCMB 687 is connected by a cross-connection in cross connect drawer 109 to mux/demux 690. Cross connect drawer 109 is shown in the open position beneath cable storage drawer 108, such that components mounted on baseplate 601 and lateral members 622 are seen.

Fiber optic cable 688, terminated on LCMB 687, enters cross connect drawer 109 and bends backwards around movable radius limiter 605. In fan out 645, eight of ribbons 648 are fanned out of cable 688 in a neat and workmanlike manner. Each of the eight ribbons 648 from cable 688 are terminated on the backfacing side of one of cross connect blocks 661, which has eight terminals 662.

An optical interconnection 669 is effectuated via one of fiber optic jumpers 655 (terminated by type 'MU' or similar connectors 696) between one of the eight ribbons of cable 688 (terminated by type 'MU' or similar connector 698) and a selected ribbon of cable 689 (terminated by type 'MU' or similar connector 699), each of the eight ribbons of which is fanned out in one of fan-outs 645.

In the present embodiment, jumper 655 interconnects ribbons terminated in terminals 662 in connection blocks 661 in corresponding upper and lower tiers (e.g., the one in the upper tier aligned directly above the one in the lower tier). In another embodiment, other connection formations can be used. Cable 689 bends forward around movable radius limiter 605 and leaves cross connect drawer 109 to be terminated on mux/demux 690.

FIG. 7 depicts an exemplary configuration 700 at a connection block 661 for four cross-connected interconnections between a cable 788, coming from a LCMB and four transponders of a Mux/Demux, for instance (for clarity and space considerations, the LCMB and the Mux/Demux are not shown), using components of a cross connect drawer (e.g., cross connect drawer 109; FIGS. 1, 6A–6F, etc.). Ribbon pairs 701–704 provide transmission (Tx) and reception (Rx) connections.

Optical terminations of the fiber optic ribbons 701–704 (as well as other such ribbons of cables 788 and 789) are made to optical receptacles 798 on connection block 661 by type 'MU' (or e.g., types 'LC', 'SC', etc.) optical connectors 799.

Similar terminations characterize optical jumpers 751–754. Connector block 661 effectuates an optical throughput between connectors 799 of cables 788 and those of jumpers 751–754, and between those of the jumpers and cable 789.

FIG. 8 depicts an exemplary connection configuration 800 between splitter LCMB 810 and both an 'east' Mux/Demux 820 and a 'west' Mux/Demux 830, using components of a cross connect drawer (e.g., cross connect drawer 109; FIGS. 1, 6A–6F, etc.). Exemplary designations 'east' and 'west' are used herein for illustrative differentiation.

Cable 803 proceeds from an 'east' type 'MTP'(or e.g., types 'MTO', etc.) optical connector 801 to a fan-out 645, where its ribbons 648 are connected to a connector block 661. Similarly, cable 804 proceeds to another connection block 661 via another fan-out 645 from a 'west' type 'MTP' connector 802.

Jumpers 655 optically intercouple ribbons 648 of cables 803 and 804 with the fanned-out ribbons of cables 805 and 806, respectively, via their respective connection blocks 661. Cable 805 connects via a type 'MTP' connector 831 to 'east' Mux/Demux 830. Cable. 806 connects via a type 'MTP' connector 821 to 'west' Mux/Demux 820.

FIG. 9 depicts an exemplary connection configuration 900 between an 'east' non-splitter LCMB 901 and an 'east' Mux/Demux 906, and between a 'west' LCMB 911 and an 'east' Mux/Demux 916, using components of a cross connect drawer (e.g., cross connect drawer 109; FIGS. 1, 6A–6F, etc.). Exemplary designations 'east' and 'west' are used herein for illustrative differentiation.

Cable 903 proceeds from an 'east' type 'MTP'(or e.g., types 'MTO', etc.) optical connector 902 terminated on 'east' LCMB 901 to a fan-out 645, where its ribbons 648 are connected to a connector block 661. Similarly, cable 913 proceeds to another connection block 661 via another fan-out 645 from a 'west' type 'MTP' connector 912 on 'west' LCMB 911.

Jumpers 655 optically intercouple ribbons 648 of cables 903 and 913 with the fanned-out ribbons of cables 904 and 914, respectively, via their respective connection blocks 661. Cable 904 connects via a type 'MTP' connector 905 to 'east' Mux/Demux 906. Cable 914 connects via a type 'MTP' connector 915 to 'west' Mux/Demux 916.

For fiber optic cross connections, a simple cross connect configuration 1000 can be effectuated as depicted in FIG. 10 between components or modules such as module 1001 and component 1004, using components of a cross connect drawer 109. A type 'MTP'(or e.g., type 'MTO', etc.) connector terminates cables 1002 and 1003 on module 1001 and component 1004, respectively.

Cable 1002 enters cross connect drawer 109, where its ribbons 648 are fanned out from a fan-out 645. The ribbons are terminated by a type 'MU'(or e.g., types 'LC' or 'SC', etc.) connector on a cross connect block 661U of one (e.g., upper) tier, which optically couples them to other type 'MU' connectors on fiber optic jumpers 655. Jumpers 655 couple them to a cross connect block 661L of another (e.g., lower) tier.

In one embodiment, connector blocks 661U and 661L are arranged vertically, one over the other. In another embodiment, they are arranged in another configuration. Cross connect block 661L then optically couples them to type 'M' connectors on ribbons 648, which are fanned out of cable 1003. Cable 1003 then couples via a type 'MTP' connector to component 1004.

FIG. 11 depicts a configuration 1100 wherein signals of four wavelengths from two splitter based LCMBs are so routed through a cross connect drawer 109 to connect to four separate Mux/Demux modules 1110–1140. Signals are routed from LCMB 1101 through the components of drawer 109 to Mux/Demux 1110 and Mux/Demux 1120. Signals are routed from LCMB 1102 through the components of drawer 109 to Mux/Demux 1130 and Mux/Demux 1140.

FIG. 12 depicts a configuration 1200 wherein signals of four wavelengths from a non-splitter based LCMB 1201 are so routed through a cross connect drawer 109 to connect to four separate Mux/Demux modules 1210–1240. Signals are routed from LCMB 1201, through line cards 1202–1205, then through the components of drawer 109. From drawer 109, the signals are routed such that the signals from line card 1202 are coupled to Mux/Demux 1210, from line card 1203 to Mux/Demux 1220, from line card 1204 to Mux/Demux 1130, and from line card 1205 to Mux/Demux 1140.

Exemplary configurations 1000 through 1200 (FIGS. 10–12, respectively) are not intended to delimit the connection configurations effectuated by embodiments of the present invention. Rather exemplary configurations 1000 through 1200 herein illustrate the advantageous versatility of cross connections so effectuated. Other configurations are possible.

Further, in other embodiments, electrical leads are fanned out of a cable and terminated in the connection blocks, which provide electrical connections. These leads are electrically interconnected by electrical jumpers. Embodiments of the present invention are well suited to cross connect a variety of optical and/or electrical cables. Similar versatility is meant to be illustrated by the configurations discussed herein for such embodiments.

FIG. 13A depicts a front view and FIG. 13B a rear view of a vertical cable guide 1300 for optical fiber cables. Vertical cable guide 1300 provides edge protection as fiber optics enter and exit storage drawers 108 and cross connect drawers 109 (FIG. 1, etc.), bundles the cables neatly and in a workmanlike manner, and provides physical protection to the fiber optics along the sides of installation 100 (FIG. 1).

Vertical cable guide 1300 has a back plate 1301 which fastens to vertical structural members of installation 100 such as a rack strut. Clip 1302 allows edge protector 1303 to be secured about cables, bundling them neatly within the guide. As illustrated, vertical cable guide.is applicable for fiber optics cables. By using construction from insulating materials of somewhat greater dimensions than those illustrated, vertical cable guide 1300 can be applicable to electrical cables as well.

FIG. 14 depicts a fanning tray 1400. Fanning tray 1400 provides vertical-to-horizontal cable transition management, physical protection, and a horizontal raceway for cables exiting the portion of an installation (e.g., installation 100; FIG. 1) housing electronics components and modules (e.g., Mux/Demux 103; FIG. 1). Fanning tray 1400 is attached to the installation by clamps 1405. Edge protectors 1401 provide protection to the cables fanned through the tray around them. Radius limiters 1402 also protect the cables by insuring that they are not bent passed their specifications while making vertical-to-horizontal transitions.

Exemplary Processes

Exemplary processes are described below for routing cables to effectuate a direct connection and a cross connection using cable storage and cross-connect drawers, as described above. The processes herein refer to routing exemplary fiber optic cables. However, the processes described are intended to exemplify the routing of any type of cable according to an embodiment of the present invention and are not meant to be limiting to fiber optics.

Exemplary Direct Connection

FIG. 15 is a flowchart depicting the steps in a process 1500 for effectuating direct connections through a cable storage drawer (e.g., storage drawer 108; FIGS. 1, 2A, etc.). Process 1500 begins with step 1501, wherein the cable storage drawer is opened. In step 1502, the cable storage drawer is pulled out from the drawer box and locked in an open position.

In step 1503, a cable to be routed is connected to a 'source' component or module, such as a LCMB. The connection can be made, for instance, by coupling a type 'MTP'(or e.g., type 'MTO', etc.) or another connector terminating the cable to be routed into a corresponding receptacle on the 'source' component/module.

It is appreciated that signals may also be received by the 'source' component, and transmitted by 'load' components; the terms 'source' refers herein to the component/module at which the cable to be routed originates. Correspondingly, 'load' refers herein to the destination component/module for the cable being routed. The terms 'source' and 'load' are used herein for convenience of reference to routing origin and routing destination, respectively, and do not limit these components and modules to transmission or reception or to strict source and load identities.

In step 1504, the cable is routed through a cable management tray (e.g., tray 106; FIG. 1). In step 1505, the cable is routed 'down' the 'source' side (e.g., the side closest to the 'source' component/module, or at which the cable is drawn from the cable management tray) of the chassis (e.g., chassis 101; FIG. 1) and into a cable storage drawer (e.g., cable storage drawer 108; FIGS. 1, 2A, etc.).

In step 1506, the cable is routed through the cable storage drawer, about its radius limiting retainers (e.g., radius limiters 205, 207, 209; FIG. 2A, etc.) to achieve a neat and workmanlike routing with minimal slack, to the 'load' side (e.g., the side farthest from the 'source' component/module, or closest to the destination component/module) of the cable storage drawer.

In step 1507, the cable is routed out of the cable storage drawer, 'up' the load side of the chassis and back through the cable management tray. It is appreciated that the terms 'up' and 'down' are used herein for convenience. In some installations served by another embodiment, the vertical directions can be interchangeable, and in some embodiments, replaced by horizontal and/or diagonal directions, depending upon the installation.

In step 1508, the cable is connected to the 'load' component/module, such as by coupling a type 'MTP' or another connector to a corresponding receptacle of the 'load' component/module. In step 1509, it is determined whether another cable is to be routed. If it is determined that another other cable is to be routed, then process 1500 loops back to step 1503 and repeats therefrom. If it is determined that no other cable is then to be routed, process 1500 is complete.

Exemplary Cross Connection

FIG. 16 is a flowchart depicting the steps in a process 1600 for effectuating cross connections through a cable cross connect drawer (e.g., cross connect drawer 109; FIGS. 1, 6A, etc.). Process 1600 begins with step 1601, wherein the cable storage drawer is opened. In step 1602, the cable storage drawer is pulled out from the drawer box and locked in an open position.

In step 1603, a cable to be routed is connected to a 'source' component or module, such as a LCMB. The connection can be made, for instance, by coupling a type 'MTP'(or e.g., type 'MTO', etc.) or another connector terminating the cable to be routed into a corresponding receptacle on the 'source' component/module.

It is appreciated that signals may also be received by the 'source' component, and transmitted by 'load' components; the terms 'source' refers herein to the component/module at which the cable to be routed originates. Correspondingly, 'load' refers herein to the destination component/module for the cable being routed. The terms 'source' and 'load' are used herein for convenience of reference to routing origin and routing destination, respectively, and do not limit these components and modules to transmission or reception or to strict source and load identities.

In step 1604, the cable is routed through a cable management tray (e.g., tray 106; FIG. 1). In step 1605, the cable is routed 'down' the 'left' side of the chassis (e.g., chassis 101; FIG. 1) and into a cable storage drawer (e.g., cable storage drawer 108; FIGS. 1, 2A, etc.).

In step 1606, the cable is routed through the cable storage drawer, about its radius limiting retainers (e.g., radius limiters 205, 207, 209; FIG. 2A, etc.) to achieve a neat and workmanlike routing with minimal slack, to the opposite side. In step 1607, the cable is routed out of the cable storage drawer, 'up' the load side of the chassis and back through the cable management tray.

It is appreciated that the terms 'up' and 'down', and 'left' and 'right' are used herein for convenience. In some installations served by another embodiment, the vertical directions and the horizontal directions can all be interchangeable, and in some embodiments, replaced by each other and/or diagonal directions, depending upon the installation.

In step 1608, the cable storage drawer is closed. In step 1609, the cable cross-connect drawer most appropriate (e.g., convenient) for the configuration being effectuated is opened. In step 1610, the fan-out end of the cable is routed into the left side of the cross-connect drawer.

In step 1611, the end of the cable is fanned out on fan-outs (e.g., fan-outs 645; FIGS. 6B, 6C, etc.) and cross-connect blocks (e.g., cross-connects 661; FIG. 6C, etc.) are installed. In step 1612, the fanned out cable ribbons are connected to the cross-connect block. The connections can be made for instance by coupling type 'MU'(or e.g., type 'LC', 'SC', etc.) connectors to corresponding receptacles on the cross-connect blocks.

In step 1613, a cable to be routed to complete the cross connection is connected to a 'load' component/module. In step 1614, steps '1604' through '1613' are repeated for the cable to be routed to complete the cross connection, as appropriate, and making directional reference adjustments as necessary.

In step 1615, it is determined whether another cable is to be routed. If it is determined that another other cable is to be routed, then process 1600 loops back to step 1601 and repeats therefrom. If it is determined that no other cable is then to be routed, process 1600 is complete.

One embodiment of the present invention provides an apparatus for managing the routing of a cable, which said cable couples a first component to a second component in an installation. The apparatus includes a first drawer for storing a portion of the cable and a second drawer mounted proximate to the first drawer. The cable has a first cable section with a first end connected to the first component and a second end connected to the first end of a second cable section, which is connected to the second component. In one embodiment, the first drawer includes means for storing the portion of cable and the second drawer provides means for coupling the cable ends.

One embodiment of the present invention comprises an apparatus capable of managing the routing of a cable (e.g., an optical fiber, electrical wire, etc.) that intercouples two components (e.g., an LCMB and a Mux/Demux, etc.). FIG. 17 depicts an exemplary apparatus 1700 for cable routing management, according to one embodiment of the present invention. Cable routing management apparatus 1700 can be deployed with an installation (e.g., networking cabinet 100; FIG. 1) having the intercoupled components (e.g., LCMB 104, Mux/Demux Modules 103; FIG. 1).

A first cable section 1703 is connected to first component 1701 and runs through a guide 1708, which protects the edge thereof, into drawer 1705, which stores a portion of cable section 1703. In one embodiment, in storing the portion of cable section 1703, it can be routed in an essentially serpentine manner through drawer 1705 (e.g., FIGS. 3A–3B), for instance, bent about on internal routing components.

A second cable section 1704 connects to a second component 1702. Second cable section 1704 can be coupled directly to first cable section 1703, as shown by route 1719. For instance, second cable section 1704 and first cable section 1703 can comprise different sections of the same cable. Alternatively, second cable section 1704 and first cable section 1703 can comprise sections of separate cables.

In summary, an apparatus for managing the routing of a cable intercoupling two components in an installation is disclosed. The apparatus has a drawer for storing a portion of the cable and a drawer for cross-connecting the cable, which is connected to one component, with another cable, which is connected to the other component. The apparatus can be used with optical and electrical cables.

An embodiment of the present invention, an apparatus for cable routing management, is thus described. While the present invention has been described in particular embodiments, it should be appreciated that the present invention should not be construed as limited by such embodiments, but rather construed according to the following claims and their equivalents.

What is claimed is:

1. An apparatus for managing the routing of a plurality of cables in a cabinet, one of said plurality of cables coupling between a first drawer and a first component, and a second of said plurality of cables coupling between a second component and a second drawer, said first component and said second component including optical or electrical Mux/Demux modules, line cards, or optical transponders, said apparatus comprising:

said first drawer for storing a portion of one of said cables and having a plurality of limiters and said second drawer mounted proximate to said first drawer and having a coupling device, wherein said storing portion of said cables is couapleable to said second plurality of cables by said coupling device, wherein each of said drawers has a frame, said frame comprising a faceplate, a back plate, and two sliding lateral members, and said frame secured within a frame box by a mounting bracket, and wherein said frame of said first drawer supports a clip for preventing a bent-on said cables from moving from a movable radius of said limiters during movement of said drawer.

2. The apparatus as recited in claim 1, further comprising a tray proximate to said first drawer for managing a directional transition of said cables.

3. The apparatus as recited in claim 2, wherein said directional transition comprises a direction change selected from the group consisting essentially of vertical-to-horizontal and horizontal-to-vertical.

4. The apparatus as recited in claim 1, further comprising a guide for said cables wherein said guide protects an edge of said cables at an entry to one of said first and said second drawers.

5. The apparatus as recited in claim 1, wherein said cables are routed within said first drawer in an essentially serpentine configuration.

6. The apparatus as recited in claim 5, wherein said first drawer further comprises a plurality of limiters for limiting a radius of a bend in said cables comprising said serpentine configuration.

7. The apparatus as recited in claim 6, wherein each of said plurality of limiters comprise a limiter selected from the group consisting essentially of a movable limiter, a versatile limiter, and a fixed limiter.

8. The apparatus as recited in claim 7, wherein said first drawer further comprises a slidable lateral member and wherein said movable limiter is mounted thereon.

9. The apparatus as recited in claim 7, wherein said first drawer further comprises a bracket, and wherein said versatile limiter is mounted upon said bracket such that its position can be adjusted thereon.

10. The apparatus as recited in claim 9, wherein an aspect of said bend is changed by adjusting the position of said versatile limiter upon said bracket.

11. The apparatus as recited in claim 10, wherein said aspect comprises a attribute selected from the group consisting essentially of a limitation in said radius of bend and a tension in said cables.

12. The apparatus as recited in claim 1, wherein said second drawer comprises a coupling device for coupling said second end of said first cable section to a first end of said second cable section, wherein said coupling device couples said second end of said first cable section to said first end of a second cable section by transmitting a signal from said first cable section to said second cable section.

13. The apparatus as recited in claim 12, wherein said coupling device further comprises:

a cross-connect block; and a jumper, wherein said cross-connect block and said jumper are transmissive of said signal.

14. The apparatus as recited in claim 13, wherein said cross connect block comprises a plurality of individual blocks.

15. The apparatus as recited in claim 14, wherein each of said plurality of individual blocks is arranged in a tiered configuration.

16. The apparatus as recited in claim 13, wherein said second drawer comprises a fan-out device for fanning out said second end of said first cable section.

17. The apparatus as recited in claim 16, wherein said fan-out device further fans out said first end of said second cable section.

18. The apparatus as recited in claim 17, wherein said first cable section and said second cable section each comprise a plurality of channels, wherein said second end of said first cable section and said first end of said second cable section comprise individual ribbons comprising said channels, and wherein said fanning out is achieved by configuring said ribbons.

19. The apparatus as recited in claim 18, wherein said individual ribbons and said jumpers are connected to said cross-connect blocks so as to couple each of said plurality of channels.

20. The apparatus as recited in claim 12 wherein said first cable section is routed within said second drawer in an essentially serpentine configuration.

21. The apparatus as recited in claim 20 wherein said second drawer further comprises a plurality of limiters for limiting a radius of a bend in said first cable section comprising said serpentine configuration.

22. The apparatus as recited in claim 21, wherein each of said plurality of limiters comprise a limiter selected from the group consisting essentially of a movable limiter, a small limiter, and a fixed limiter.

23. The apparatus as recited in claim 22, wherein said second drawer further comprises a slidable lateral member and wherein said moveable limiter is mounted thereon.

24. The apparatus as recited in claim 1 wherein said first component and said second component are intercoupled by a connection selected from the group consisting essentially of a direct connection and a cross connection.

25. The apparatus as recited in claim 24 wherein said direct connections achieved via said first drawer.

26. The apparatus as recited in claim 25, wherein said cross connection achieved via said second drawer after routing said cables through said first drawer.

27. The apparatus as recited in claim 24 wherein said cross connection achieved via said second drawer.

28. The apparatus as recited in claim 1 wherein said cables comprises a medium selected from the group consisting essentially of optical and electrical media.

29. An apparatus for managing the routing of a plurality of cables in a cabinet, one of said plurality of cables coupling between a first drawer and a first component, and a second plurality of cables coupling between a second component and a second drawer, said first component and said second component including optical or electrical Mux/Demux modules, line cards, or optical transponders, said apparatus comprising:

said first drawer for storing a portion of one of said cables and having a plurality of limiters; and said second drawer mounted proximate to said first drawer and having a coupling device, wherein said storing portion of said cables is coupleable to said second plurality of cables by said coupling device, wherein each of said drawers has a frame, said frame comprising a faceplate, a back plate, and two sliding lateral members, and said frame secured within a frame box by a mounting bracket, and wherein said frame of said first drawer supports a clip for preventing a bent-on said cable from moving from a movable radius of said limiters during movement of said drawer;

a method of intercoupling said first component and said second component of said installation, comprising:

connecting each said cable to a respective said component; configuring each said cable through said first drawer; running each said cable into said second drawer; and cross-connecting each said cable of said cables one to the other, wherein each said cable is cross-connected one to the other via said cross-connect device.

30. An apparatus for managing the routing of a plurality of cables in a cabinet, one of said plurality of cables coupling between a first drawer and a first component, and a second plurality of cables coupling between a second component and a second drawer, said first component and said second component including optical or electrical Mux/Demux modules, line cards, or optical transponders, said apparatus comprising:

a first means for storing a portion of one of said cables and having a plurality of limiters, wherein said first means includes said first drawer; and a second means mounted proximate to said first-means and having a coupling device, wherein said second means includes said second drawer, wherein said storing portion of said cables is coupleable to said second plurality of cables by said coupling device, wherein each of said drawers has a frame, said frame comprising a faceplate, a back plate, and two sliding lateral members, and said frame secured within a frame box by a mounting bracket, and wherein said frame of said first drawer supports a clip for preventing a bent-on said cables from moving from a movable radius of said limiters during movement of said drawer.

31. The apparatus as recited in claim 30, further comprising a third means for managing a directional transition of said cables.

32. The apparatus as recited in claim 31 wherein said directional transition comprises a direction change selected from the group consisting essentially of vertical-to-horizontal and horizontal-to-vertical.

33. The apparatus as recited in claim 30, wherein said first means further comprises means for limiting a radius of a bend in said cables.

34. The apparatus as recited in claim 30 wherein said second means comprises means for coupling said second end of said first cable to a first end of said second cable, wherein said means for coupling said second end of said first cable to said first end of said second cable by transmitting a signal from said first cable to said second cable.

35. The apparatus as recited in claim 34 wherein said means for coupling further comprises: a cross-connect block; and a jumper, wherein said cross-connect block and said jumper are transmissive of said signal.

36. The apparatus as recited in claim 34 wherein said second means further comprises means for fanning out said second end of said first cable.

37. The apparatus as recited in claim 36 wherein said means for fanning-out further fans out said first end of said second cable.

38. Tire apparatus as recited in claim 30 wherein said first component and said second component are intercoupled by a means for intercoupling selected from the group consisting essentially of a means for achieving a direct connection and a means for achieving a cross connection.

39. The apparatus as recited in claim 38 wherein said mean for achieving said direct connection comprises said storing means.

40. The apparatus as recited in claim 38 wherein said means for achieving across connection is achieved via said coupling means.

41. The apparatus as recited in claim 30 wherein said cables comprises a medium selected from the group consisting essentially of optical and electrical media.

* * * * *